United States Patent
Misra et al.

(10) Patent No.: US 9,880,997 B2
(45) Date of Patent: *Jan. 30, 2018

(54) INFERRING TYPE CLASSIFICATIONS FROM NATURAL LANGUAGE TEXT

(71) Applicant: Accenture Global Services Limited, Dublin (IE)

(72) Inventors: Janardan Misra, Pithoragarh (IN); Ruchika Sharma, Rajasthan (IN)

(73) Assignee: Accenture Global Services Limited, Dublin (IE)

( * ) Notice: Subject to any disclaimer, the term of this patent is extended or adjusted under 35 U.S.C. 154(b) by 208 days.

This patent is subject to a terminal disclaimer.

(21) Appl. No.: 14/478,906

(22) Filed: Sep. 5, 2014

(65) Prior Publication Data

US 2016/0026621 A1 Jan. 28, 2016

(30) Foreign Application Priority Data

Jul. 23, 2014 (IN) .......................... 3597/CHE/2014

(51) Int. Cl.
*G06F 17/00* (2006.01)
*G10L 15/00* (2013.01)
*G06F 17/27* (2006.01)
*G06F 17/21* (2006.01)

(52) U.S. Cl.
CPC ........ *G06F 17/2785* (2013.01); *G06F 17/218* (2013.01); *G06F 17/2795* (2013.01)

(58) Field of Classification Search
None
See application file for complete search history.

(56) References Cited

U.S. PATENT DOCUMENTS

| 5,297,039 | A | * | 3/1994 | Kanaegami | G06F 17/30684 |
| 6,076,088 | A | * | 6/2000 | Paik | G06F 17/30707 |
| 6,195,792 | B1 | * | 2/2001 | Turnbull | G06F 8/437 717/110 |
| 6,470,306 | B1 | * | 10/2002 | Pringle | G06F 17/241 704/3 |
| 6,553,385 | B2 | * | 4/2003 | Johnson | G06F 17/2755 |

(Continued)

OTHER PUBLICATIONS

Princeton, "WordNet: A lexical database for English," http://wordnet.princeton.edu/, Nov. 7, 2013, 3 pages.

(Continued)

*Primary Examiner* — Fariba Sirjani
(74) *Attorney, Agent, or Firm* — Harrity & Harrity, LLP

(57) ABSTRACT

A device may obtain text to be processed to infer type classifications associated with terms in the text. The type classifications may indicate types of values that the terms are intended to represent. The device may infer type classifications corresponding to terms in the text by performing a type classification technique. The type classification technique may include a name-based analysis, a context-based analysis a synonym-based analysis, or a valued-based analysis. These analyses may compare information, associated with the terms in the text, to type indicators that indicate the type classifications. The device may provide information that identifies a type relationship between a particular type classification and a particular term based on inferring the one or more type classifications.

20 Claims, 11 Drawing Sheets

(56) References Cited

U.S. PATENT DOCUMENTS

| | | | | |
|---|---|---|---|---|
| 8,321,434 B1* | 11/2012 | Ren | G06F 21/55 | 704/7 |
| 8,433,559 B2* | 4/2013 | Madan | G06F 17/2735 | 704/3 |
| 8,494,985 B1* | 7/2013 | Keralapura | H04L 63/045 | 706/12 |
| 8,751,466 B1* | 6/2014 | Tsay | G06F 17/30864 | 707/700 |
| 8,855,999 B1* | 10/2014 | Elliot | G06F 17/2705 | 704/1 |
| 8,903,717 B2* | 12/2014 | Elliot | G06F 17/2705 | 704/1 |
| 8,959,025 B2* | 2/2015 | Malinsky | G10L 19/167 | 382/239 |
| 8,983,826 B2* | 3/2015 | Brdiczka | G06F 17/2705 | 704/257 |
| 9,275,132 B2* | 3/2016 | Roberts | G06F 17/3053 | |
| 2002/0062302 A1* | 5/2002 | Oosta | G06F 17/30713 | |
| 2004/0194009 A1* | 9/2004 | LaComb | G06F 17/211 | 715/239 |
| 2004/0243557 A1* | 12/2004 | Broder | G06F 17/2785 | |
| 2005/0114771 A1* | 5/2005 | Piehler | G06F 17/21 | 715/264 |
| 2005/0125216 A1* | 6/2005 | Chitrapura | G06F 17/2785 | 704/1 |
| 2005/0165600 A1* | 7/2005 | Kasravi | G06F 17/2211 | 704/9 |
| 2006/0277029 A1* | 12/2006 | Green | G06F 17/2785 | 704/4 |
| 2007/0094734 A1* | 4/2007 | Mangione-Smith | G06F 21/564 | 726/24 |
| 2007/0162447 A1* | 7/2007 | Joshi | G06F 17/30864 | |
| 2008/0208567 A1* | 8/2008 | Brockett | G06F 17/274 | 704/9 |
| 2008/0235004 A1* | 9/2008 | Gago | G10L 13/08 | 704/9 |
| 2009/0138793 A1* | 5/2009 | Verma | G06F 8/10 | 715/234 |
| 2010/0174528 A1* | 7/2010 | Oya | G06F 17/2735 | 704/10 |
| 2010/0185691 A1* | 7/2010 | Irmak | G06F 17/30707 | 707/803 |
| 2011/0099052 A1* | 4/2011 | Brun | G06F 17/2211 | 705/7.38 |
| 2011/0238663 A1* | 9/2011 | Zhang | G06F 17/30734 | 707/736 |
| 2012/0078888 A1* | 3/2012 | Brown | G06F 17/30654 | 707/723 |
| 2013/0097583 A1* | 4/2013 | Kung | G06F 8/10 | 717/105 |
| 2013/0124193 A1* | 5/2013 | Holmberg | G06F 17/27 | 704/9 |
| 2013/0246049 A1* | 9/2013 | Mirhaji | G06F 17/30312 | 704/9 |
| 2013/0246435 A1* | 9/2013 | Yan | G06F 17/3071 | 707/741 |
| 2014/0108305 A1* | 4/2014 | Gulwani | G06F 17/2264 | 706/12 |
| 2014/0172417 A1* | 6/2014 | Monk, II | G06F 17/2785 | 704/9 |
| 2014/0244241 A1* | 8/2014 | Ghaisas | G06F 17/27 | 704/9 |
| 2014/0350961 A1* | 11/2014 | Csurka | G06F 19/322 | 705/3 |
| 2015/0052098 A1* | 2/2015 | Kveton | G06F 17/30731 | 706/52 |
| 2015/0058349 A1* | 2/2015 | Ramnani | G06F 17/30705 | 707/740 |
| 2015/0066939 A1* | 3/2015 | Misra | G06F 17/3071 | 707/739 |
| 2015/0248396 A1* | 9/2015 | Heinze | G06F 17/271 | 704/9 |
| 2015/0261743 A1* | 9/2015 | Sengupta | G06F 17/2775 | 704/9 |
| 2016/0026621 A1* | 1/2016 | Misra | G06F 17/2785 | 704/9 |

OTHER PUBLICATIONS

Ruchika Sharma, "Automatic Test Data Generation from Natural Language Requirements," International Institute of Information Technology Bangalore, Jun. 2014, 24 pages.

University of Pennsylvania, "Penn Treebank P.O.S. Tags," https://www.ling.upenn.edu/courses/Fall_2003/ling001/penn_treebank_pos, Fall 2003, 2 pages.

Wikipedia, "Regular Expression," http://en.wikipedia.org/wiki/Regular_expression, Jul. 14, 2014, 20 pages.

* cited by examiner

Primitive Type Selection — 725 — Show/Hide Positive and Negative Data

| Select | Term | Type Classification | Confidence Score | Positive Test Data | Negative Test Data |
|---|---|---|---|---|---|
| ☑ 740 | Property List | Composite [Constituent/s Identified] | High | | |
| ☐ | Article Length 720 | Integer [Name Based] | High | 1<br>100 | abc<br>@abc<br>ab.cd<br>12.23 |
| ☐ | Tool | No-Match | | | |
| ☐ | Analysis | No-Match | | | |
| ☐ | Employee Level | Enumerator [Value Based] | Moderate | | |
| ☐ | Employee | Enumerator [Value Based] | Moderate | A-H | - |
| ☐ | Custdetail | Composite [Constituent/s Identified] | High | | - |
| ☐ | Seat Identifier | Enumerator [Value Based] | High | A1-A15 | - |
| ☐ | Record | Composite [Constituent/s Identified] | High | | - |
| ☐ | Customer Type | Enumerator [Value Based] | High | Gold<br>Bronze<br>Silver | - |
| ☐ | Random Article and User | String [Name Based] | Moderate | Illustrative Example<br>abc | |

(Next) — 735         730 — (Reset) (Save)

FIG. 7B

Constituents Selection

▶ ☒ Composite Entities
  ▶ ☒ Property List
      ☒ Owner Detail
      ☒ Location
      ☒ Property Name
      ☒ Size
  ▶ ☒ Custdetail
      ☒ Age
  ▶ ☒ Record
      ☒ Contact Detail
      ☒ Username
      ☒ Preference
      ☒ Communication
      ☒ Email ID
      ☒ Gender
      ☒ Name
      ☒ Authentication Number
      ☒ Command Head
      ☒ Emplacement

◀—— 745

(Previous) (Next)                    (Reset) (Save)

FIG. 7C

Constituents Type Selection   (Show/Hide Positive and Negative Data)

| Select | Composite Entity Type | Constituent Name | Constituent Type | Confidence Score | Positive Test Data | Negative Test Data |
|---|---|---|---|---|---|---|
| ☒ | Property List 750 | Owner Detail | String [Synonym Based] | High | Illustrative Example<br>abc<br>Hello | |
| ☒ | Property List | Location | String [Name Based] | High | Illustrative Example<br>abc<br>Hello | |
| ☒ | Property List | Property Name | String [Name Based] | High | Illustrative Example<br>abc<br>Hello | |
| ☒ | Property List | Size | Integer [Name Based] | High | Illustrative Example<br>1<br>100 | abc<br>@abc<br>ab.cd<br>12.23 |
| ☒ | Custdetail | Age | Age [Name Based] | | Illustrative Example<br>27<br>78<br>89<br>11<br>18<br>16 | -27<br>Age<br>@my<br>0<br>199<br>12+23<br>78. |
| ☒ | Record | Contact Detail | String [Synonym Based] | High | Illustrative Example<br>abc<br>Hello | |
| ☒ | Record | Username | String [Name Based] | High | Illustrative Example<br>abc<br>Hello | |
| ☒ | Record | Preference | No-Match | | | |

(Previous) (Next)    (Reset) (Save)

FIG. 7D

INFERRING TYPE CLASSIFICATIONS FROM NATURAL LANGUAGE TEXT

RELATED APPLICATION

This application claims priority to Indian Patent Application No. 3597/CHE/2014, filed on Jul. 23, 2014, the content of which is incorporated by reference herein in its entirety.

BACKGROUND

Text documents may be processed to classify terms in the text according to a type classification. A type classification may specify values that the term is capable of representing, such as integer values, string values, or the like. Classifying terms in text, such as a requirements document, may be useful for facilitating system design and development.

SUMMARY

According to some possible implementations, a device may obtain text to be processed to infer type classifications associated with terms in the text. The type classifications may indicate types of values that the terms may represent. The device may perform a type classification technique to infer type classifications corresponding to terms included in the text. The type classification technique may include a name-based analysis, a context-based analysis, a synonym-based analysis, or a value-based analysis. The name-based analysis may compare the terms to sets of name-based type indicators corresponding to the type classifications. The context-based analysis may compare modifiers, that modify the terms in the text, to sets of context-based type indicators corresponding to the type classifications. The synonym-based analysis may compare synonyms, of the terms, to the name-based type indicators corresponding to the type classifications. The value-based analysis may compare values, associated with the terms in the text, to sets of value-based type indicators corresponding to the type classifications. The device may classify the terms using the type classifications based on performing the type classification technique. The device may provide information that indicates a type relationship between a particular term and a particular type classification.

According to some possible implementations, a computer-readable medium may store instructions. The instructions may cause a processor to obtain text to be processed to infer type classifications associated with terms in the text. The type classifications may indicate types of values that the terms are intended to represent. The instructions may cause the processor to infer type classifications corresponding to terms in the text by performing a type classification technique. The type classification technique may include a name-based analysis, a context-based analysis a synonym-based analysis, or a valued-based analysis. The name-based analysis may compare the terms to name-based type indicators that indicate the type classifications. The context-based analysis may compare modifiers, that modify the terms in the text, to context-based type indicators that indicate the type classifications. The synonym-based analysis may compare synonyms, of the terms, to the name-based type indicators that indicate the type classifications. The value-based analysis may compare values, associated with the terms in the text, to value-based type indicators that indicate the type classifications. The instructions may cause the processor to provide information that identifies a type relationship between a particular type classification and a particular term based on inferring the one or more type classifications.

According to some possible implementations, a method may include obtaining, by a device, text to be processed to infer type classifications associated with terms in the text. The type classifications may indicate types of values that the terms are capable of representing. The method may include inferring, by the device, a type relationship between a particular term and a particular type classification by performing a type classification technique. The type classification technique may include a name-based analysis, a context-based analysis a synonym-based analysis, or a valued-based analysis. The name-based analysis may compare the particular term to a set of name-based type indicators associated with the particular type classification. The context-based analysis may compare a modifier, that modifies the particular term in the text, to a set of context-based type indicators associated with the particular type classification. The synonym-based analysis may compare a synonym, of the particular term, to the set of name-based type indicators associated with the particular type classification. The value-based analysis may compare a value, that appears within a threshold proximity of the particular term in the text, to a set of value-based type indicators or a set of value-based type patterns associated with the particular type classification. The method may include providing, by the device, information that identifies the type relationship, between the particular term and the particular type classification, based on inferring the type relationship and further based on performing the type classification technique.

BRIEF DESCRIPTION OF THE DRAWINGS

FIGS. 7A-7D are diagrams of an example implementation relating to the example process shown in FIG. 6.

DETAILED DESCRIPTION

The following detailed description of example implementations refers to the accompanying drawings. The same reference numbers in different drawings may identify the same or similar elements.

A text document may include terms that imply particular types of values that the term may represent, which may be referred to as a type classification of the term. For example, a requirements document for a software application may include terms for representing integer values, floating point values, string values, Boolean values, etc. These type classifications may not be explicitly associated with terms in the text. However, a user, such as a software engineer, may want to know the type classifications of the terms in the text document to assist in, for example, developing and/or designing a system from the text document. Implementations described herein assist in inferring type classifications for terms in a text document.

Figure 1:
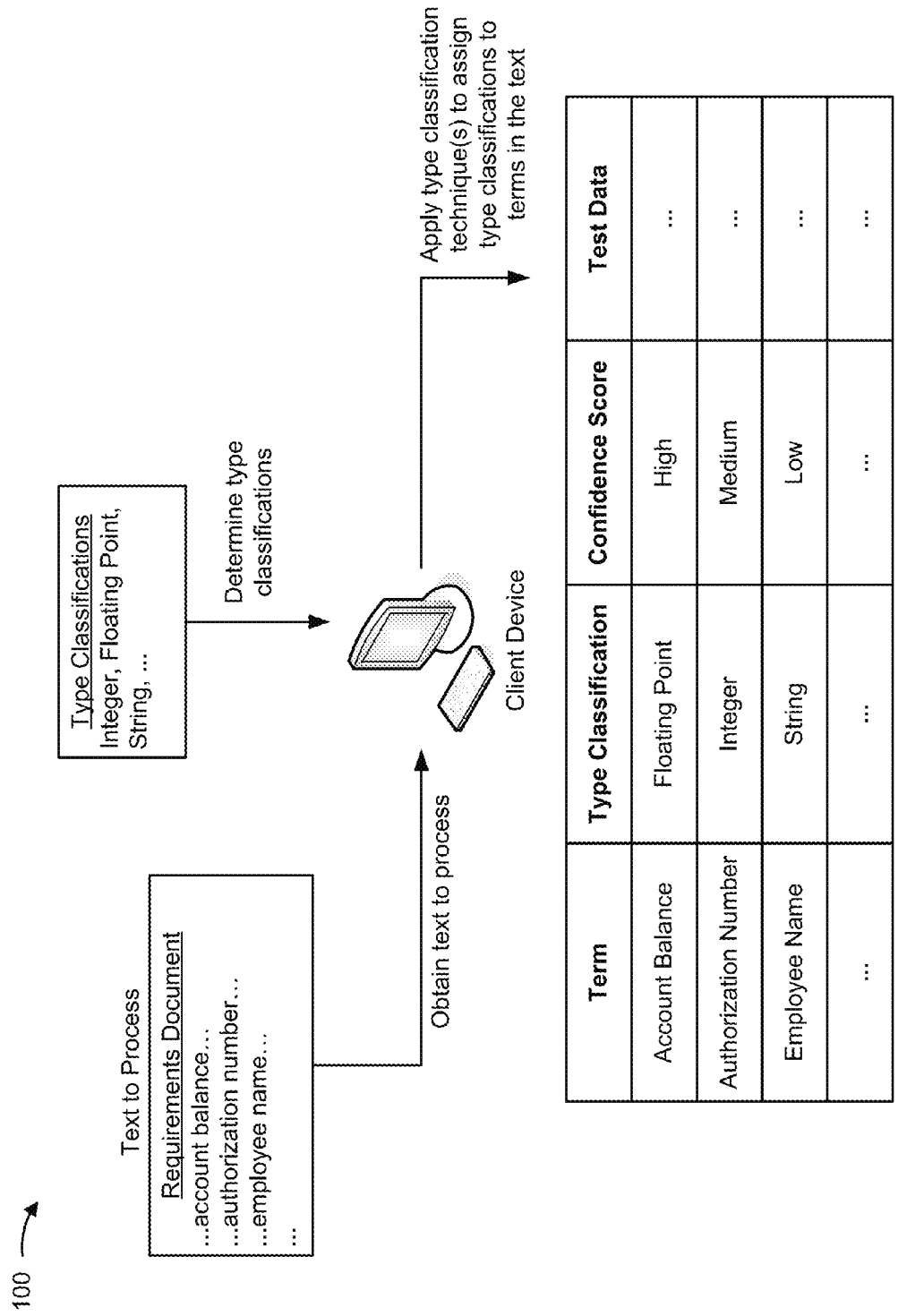
FIG. 1 is a diagram of an overview of an example implementation described herein.

FIG. 1 is a diagram of an overview of an example implementation 100 described herein. As shown in FIG. 1, a client device (e.g., a desktop computer, a laptop computer, etc.) may obtain text to be processed to infer type classifications for terms in the text. For example, assume that the text is a requirements document that includes the terms "account balance," "authorization number," and "employee name," as shown. As further shown, the client device may determine type classifications to be used to classify terms in the text, such as "integer," "floating point," and "string."

As further shown in FIG. 1, the client device may apply a type classification technique to assign type classifications to terms in the text. Various type classification techniques are described in more detail elsewhere herein. Furthermore, the client device may calculate a confidence score that indicates a degree of confidence of a correspondence between a particular term and a particular type indicator. Techniques for calculating the confidence score are described in more detail elsewhere herein. Furthermore, the client device may determine test data that may be used to test a system that was designed using the terms in the requirements document. Techniques for determining the test data are described in more detail elsewhere herein. As shown, the client device may provide (e.g., for display) information that identifies a term in the text, a type classification associated with the term, a confidence score that indicates a degree of confidence of a correspondence between the term and the type classification, and test data for testing a system designed based on the term. In this way, the client device may assist in inferring type classifications for terms in text, which may save time by eliminating manual processing of the text to determine type classifications, may result in more accurate type classifications, or the like.

Figure 2:
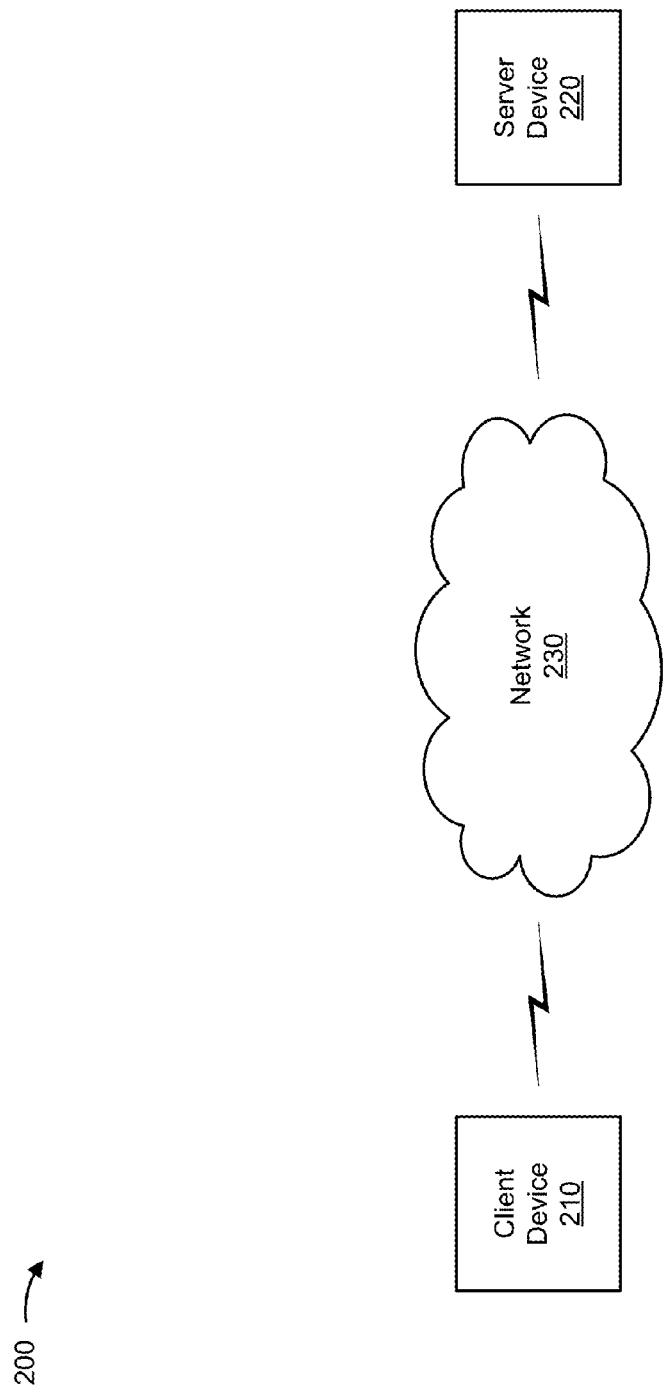
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a server device 220, and a network 230. Devices of environment 200 may interconnect via wired connections, wireless connections, or a combination of wired and wireless connections.

Client device 210 may include one or more devices capable of receiving, generating, storing, processing, and/or providing text and/or information associated with text (e.g., a term included in the text, a tag for a term included in the text, a type classification, a confidence score, test data, a type classification technique, a term glossary, etc.). For example, client device 210 may include a computing device, such as a desktop computer, a laptop computer, a tablet computer, a server device, a mobile phone (e.g., a smart phone, a radiotelephone, etc.), or a similar device. In some implementations, client device 210 may receive text to process to infer type classifications of terms in the text, and may process the text to infer the type classifications. Client device 210 may utilize one or more type classification techniques to classify terms in the text. Additionally, or alternatively, client device 210 may calculate a confidence score and/or may generate test data associated with a term in the text and/or associated with a type classification. In some implementations, client device 210 may receive information from and/or transmit information to server device 220 (e.g., text and/or information associated with text).

Server device 220 may include one or more devices capable of receiving, generating, storing, processing, and/or providing text and/or information associated with text. For example, server device 220 may include a computing device, such as a server device, a desktop computer, a laptop computer, a tablet computer, or a similar device. Server device 220 may perform one, more, or all operations described elsewhere herein as being performed by client device 210.

Network 230 may include one or more wired and/or wireless networks. For example, network 230 may include a public land mobile network (PLMN), a local area network (LAN), a wide area network (WAN), a metropolitan area network (MAN), a telephone network (e.g., the Public Switched Telephone Network (PSTN)), a cellular network, a private network, an ad hoc network, an intranet, the Internet, a fiber optic-based network, a cloud computing network, and/or a combination of these or another type of network.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
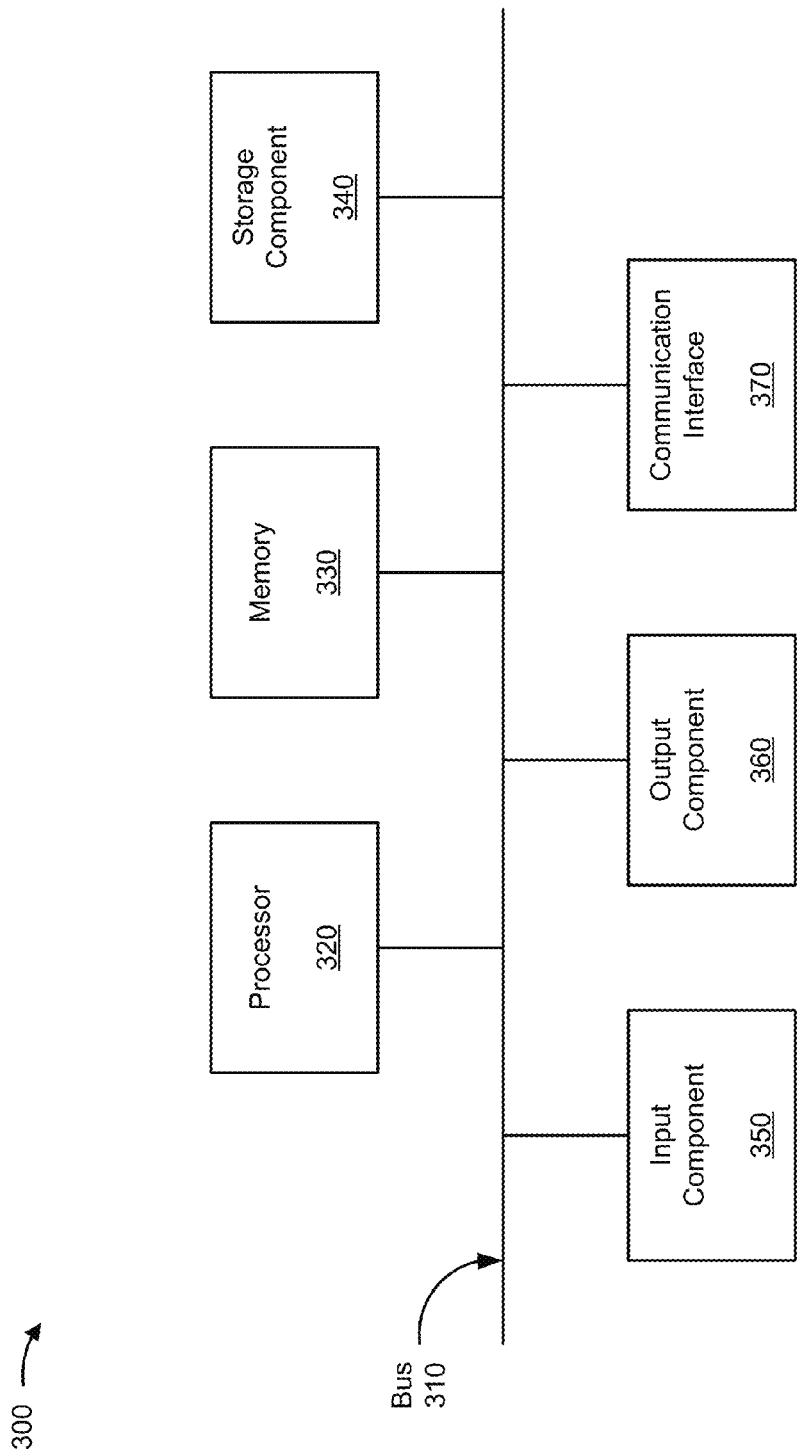
FIG. 3 is a diagram of example components of one or more devices of FIG. 2.

FIG. 3 is a diagram of example components of a device 300. Device 300 may correspond to client device 210 and/or server device 220. In some implementations, client device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
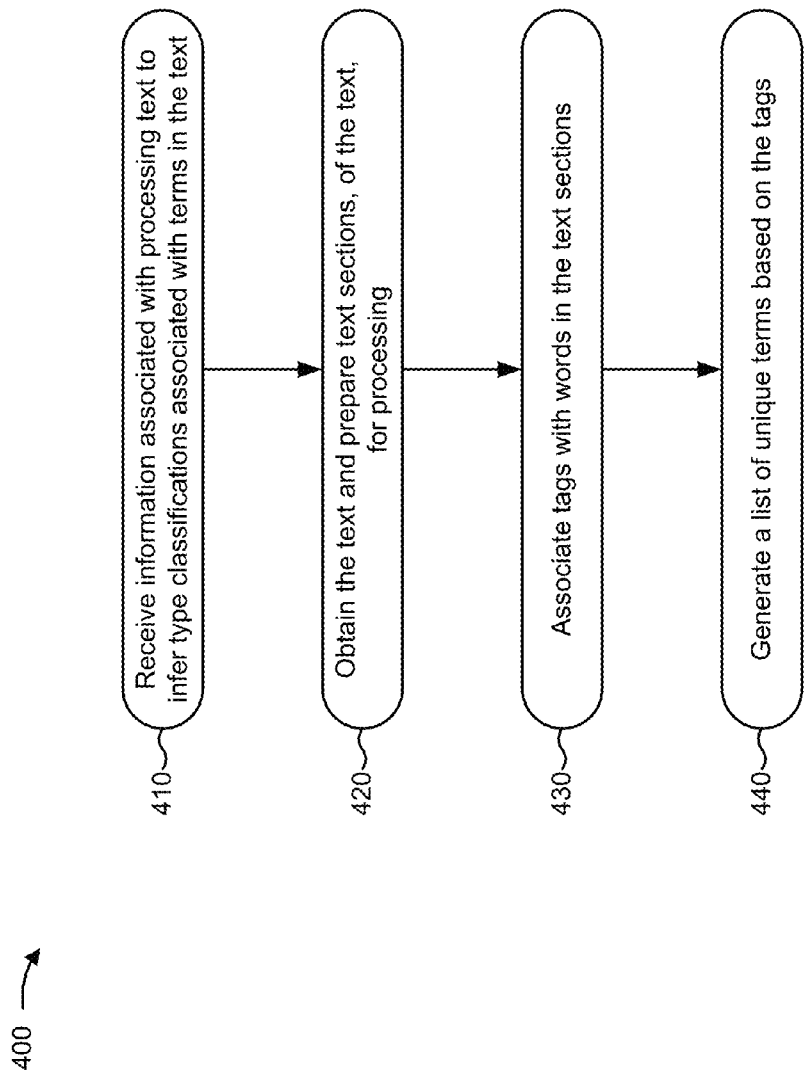
FIG. 4 is a flow chart of an example process for preparing text for processing to infer type classifications of terms in the text.

FIG. 4 is a flow chart of an example process 400 for preparing text for processing to infer type classifications of terms in the text. In some implementations, one or more process blocks of FIG. 4 may be performed by client device 210. In some implementations, one or more process blocks of FIG. 4 may be performed by another device or a group of devices separate from or including client device 210, such as server device 220.

As shown in FIG. 4, process 400 may include receiving information associated with processing text to infer type classifications associated with terms in the text (block 410). For example, client device 210 may receive information that identifies text to be processed, may receive information that identifies type classifications to be used to classify terms in the text, may receive information that identifies terms in the text, may receive information associated with a technique to be used to identify terms in the text, or the like.

Client device 210 may receive, via input from a user and/or another device, information that identifies text to be processed. For example, a user may input information identifying the text or a memory location at which the text is stored (e.g., local to and/or remote from client device 210). The text may include, for example, a document that includes text (e.g., a text file, a text document, a file that includes text and other information, such as images, etc.), a group of documents that include text (e.g., multiple files), a portion of a document that includes text (e.g., a portion indicated by a user, a portion identified by document metadata, etc.), and/or other information that includes text. In some implementations, client device 210 may receive an indication of one or more sections of text to be processed.

The text may include one or more terms. A term may refer to a set of characters, such as a single character, multiple characters (e.g., a character string), a combination of characters (e.g., in a particular order) that form a word, a combination of characters that form multiple words (e.g., a multi-word term, such as a phrase, a sentence, a paragraph, etc.), a combination of characters that form an acronym, a combination of characters that form an abbreviation of a word, a combination of characters that form a misspelled word, etc.

In some implementations, client device 210 may receive, via input from a user and/or another device, information and/or instructions for identifying terms in the text. For example, client device 210 may receive a tag list that identifies tags (e.g., part-of-speech tags, user-input tags, etc.) to be used to identify terms in the text. As another example, client device 210 may receive a term list (e.g., a glossary that identifies terms in the text, a dictionary that includes term definitions, a thesaurus that includes term synonyms or antonyms, a lexical database, such as WordNet, etc.) that identifies terms in the text (e.g., single-word terms, multi-word terms, etc.).

In some implementations, client device 210 may receive, via input from a user and/or another device, information identifying one or more type classifications to be used to classify terms in the text. For example, client device 210 may receive information that identifies one or more default type classifications to be used to classify terms in the text. As another example, client device 210 may receive information that identifies domain-specific type classifications (e.g., type classifications for a computer programming domain, for a medial domain, for a biological domain, for a financial domain, for a chemical domain, for a computing domain, for a telecommunications domain, etc.). In some implementations, client device 210 may receive information identifying one or more type indicators that indicate that a particular term is to be classified using a particular type classification.

A type classification may refer to an identifier (e.g., a label, etc.) that indicates particular types of values that a term may represent, such as numeric values, floating point values, integer values, age values, enumerator values, Boolean values, gender values, string values, uniform resource locator (URL) values, email address values, time values, data values, multimedia values (e.g., associated with image data, audio data, video data, etc.), file values (e.g., associated with digital data), null values (e.g., which cannot be associated with a value other than null), or the like. For example, when a term, such as "apartment number," is classified as an integer type, this implies that the term "apartment number" may be associated with integer values, such as 1, 30, 476, etc. Furthermore, the term "apartment number" may be further classified as a positive integer type because negative numbers are not used for apartment numbers.

In some implementations, type classifications may be hierarchical, and a term may be associated with one or more type classifications in the hierarchy. For example, the term "user age" may be classified as an age type (e.g., a positive integer less than 120). The age type may be a sub-type of a positive integer type, which may be a sub-type of an integer type, which may be a sub-type of a numeric type, which may be a sub-type of a primitive type, etc.

A type classification may include a primitive type or a composite type, in some implementations. A primitive type may be used to classify a term that does not represent (e.g., does not encompass) any other terms, and a composite type may be used to classify a term that represents one or more other terms. For example, the term "user address" may be classified as a composite type that encompasses five primitive types: a "house number" integer type, a "street name" string type, a "city" string type, a "state" string type, and a "zip code" integer type. A composite type may encompass one or more primitive types, one or more composite types, and/or one or more complex types (described below).

Additionally, or alternatively, a type classification may include a complex type. A complex type may be used to classify a term for which a type classification cannot be easily inferred as another type. For example, the term "purchase data" may be classified as a complex term if the text does not include information that indicates what type of data or terms are represented by the "purchase data."

In some implementations, client device 210 may receive user input that specifies one or more type classifications to be used to classify terms in the text, such as domain-specific type classifications. In this case, client device 210 may receive, for example, information identifying one or more type classifications included in the domain (e.g., primitive type classifications, composite type classifications, complex type classifications, etc.), one or more type indicators to be used to classify a term using a type classification, one or more value indicators that identify values that a term may represent when classified using a particular type classification, etc.

As an example, in a medical domain, the type indicators "hospital," "clinic," and "medical center" may be type indicators for a "medical institution" type classification. Thus, when client device 210 encounters the term "ABC Regional Hospital" in the text, client device 210 may classify "ABC Regional Hospital" as a "medical institution."

As further shown in FIG. 4, process 400 may include obtaining the text and preparing text sections, of the text, for processing (block 420). For example, client device 210 may obtain the text, and may prepare the text for processing to infer type classifications associated with terms in the text. In some implementations, a user may input information identifying the text or a memory location at which the text is stored. Based on the user input, client device 210 may retrieve the text. Additionally, or alternatively, client device 210 may provide a user interface via which a user may input text, and client device 210 may obtain the text based on the information input via the user interface. The text may include multiple files storing text, a single file storing text, a portion of a file storing text, multiple lines of text, a single line of text, a portion of a line of text, etc. The text may include untagged text and/or may include tagged text that has been annotated with one or more tags.

In some implementations, client device 210 may determine text sections, of the text, to be processed. For example, client device 210 may determine a manner in which the text is to be partitioned into text sections, and may partition the text into the text sections. A text section may include, for example, a sentence, a line, a paragraph, a page, a document, etc. In some implementations, client device 210 may label each text section, and may use the labels when processing the text. Additionally, or alternatively, client device 210 may process each text section separately (e.g., serially or in parallel).

Client device 210 may prepare the text (e.g., one or more text sections) for processing, in some implementations. For example, client device 210 may standardize the text to prepare the text for processing. In some implementations, preparing the text for processing may include adjusting characters, such as by removing characters, replacing characters, adding characters, adjusting a font, adjusting formatting, adjusting spacing, removing white space (e.g., after a beginning quotation mark; before an ending quotation mark; before or after a range indicator, such as a hyphen, a dash, a colon, etc.; before or after a punctuation mark, such as a percentage sign, etc.) or the like. For example, client device 210 may replace multiple spaces with a single space, may insert a space after a left parenthesis, a left brace, a left bracket, etc., may insert a space before a right parenthesis, a right brace, a right bracket, etc. In this way, client device 210 may use a space delimiter to more easily parse the text.

In some implementations, client device 210 may prepare the text for processing by expanding acronyms included in the text. For example, client device 210 may replace a short-form acronym, in the text, with a full-form term that the acronym represents (e.g., may replace "EPA" with "Environmental Protection Agency"). Client device 210 may determine the full-form term of the acronym by, for example, using a glossary or other input text, searching the text for consecutive words with beginning letters that correspond to the acronym (e.g., where the beginning letters "ex" may be represented in an acronym by "X") to identify a potential full-form term of an acronym, by searching for potential full-form terms that appear near the acronym in the text (e.g., within a threshold quantity of words), or the like.

As further shown in FIG. 4, process 400 may include associating tags with words in the text sections (block 430). For example, client device 210 may receive information that identifies one or more tags, and may associate the tags with words in the text based on tag association rules. The tag association rules may specify a manner in which the tags are to be associated with the words, based on characteristics of the words. For example, a tag association rule may specify that a singular noun tag ("INN") is to be associated with words that are singular nouns (e.g., based on a language database, a context analysis, etc.).

A word may refer to a unit of language that includes one or more characters. A word may include a dictionary word (e.g., "gas") or may include a non-dictionary string of characters (e.g., "asg"). In some implementations, a word may be a term. Alternatively, a word may be a subset of a term (e.g., a term may include multiple words). Client device 210 may determine words in the text by determining characters identified by one or more delimiting characters, such as a space, a punctuation mark (e.g., a comma, a period, an exclamation point, a question mark, etc.), or the like.

As an example, client device 210 may receive a list of part-of-speech tags (POS tags) and tag association rules for tagging words in the text with the POS tags based on the part-of-speech of the word. Example part-of-speech tags include NN (noun, singular or mass), NNS (noun, plural), NNP (proper noun, singular), NNPS (proper noun, plural), VB (verb, base form), VBD (verb, past tense), VBG (verb, gerund or present participle), VBP (verb, non-third person singular present tense), VBZ (verb, third person singular present tense), VBN (verb, past participle), RB (adverb), RBR (adverb, comparative), RBS (adverb, superlative), JJ (adjective), JJR (adjective, comparative), JJS (adjective, superlative), CD (cardinal number), IN (preposition or subordinating conjunction), LS (list item marker), MD (modal), etc.

In some implementations, client device 210 may further process the tagged text to associate additional or alternative tags with groups of words that meet certain criteria. For example, client device 210 may associate an entity tag (e.g., ENTITY) with noun phrases (e.g., consecutive words with a noun tag, such as /NN, /NNS, /NNP, /NNPS, etc.), may associate a term tag (e.g., TERM) with unique terms (e.g., single-word terms, multi-word terms, etc.). In some implementations, client device 210 may only process terms with particular tags, such as noun tags, entity tags, verb tags, term tags, etc., when classifying terms in the text.

As further shown in FIG. 4, process 400 may include generating a list of unique terms based on the tags (block 440). For example, client device 210 may generate a list of unique terms associated with one or more tags. The list of unique terms (e.g., a term corpus) may refer to a set of terms (e.g., single word terms, multi-word terms, etc.) extracted from the text. In some implementations, the term corpus may include terms tagged with a noun tag and/or a tag derived from a noun tag (e.g., an entity tag applied to words with successive noun tags, a term tag, etc.). Additionally, or alternatively, the term corpus may include terms identified based on input provided by a user (e.g., input that identifies multi-word terms; input that identifies a pattern for identifying multi-word terms, such as a pattern of consecutive words associated with particular part-of-speech tags, a pattern of terms appearing at least a threshold quantity of times in the text; etc.), which may tagged with a term tag in some implementations. Additionally, or alternatively, the term corpus may include terms extracted from section headings of the text.

In some implementations, client device 210 may receive information that identifies stop tags or stop terms. The stop tags may identify tags associated with terms that are not to be included in the list of unique terms. Similarly, the stop terms may identify terms that are not to be included in the list of unique terms. When generating the list of unique terms, client device 210 may only add terms to the list that are not associated with a stop tag or identified as a stop term.

Additionally, or alternatively, client device 210 may convert terms to a root form when adding the terms to the list of unique terms. For example, the terms "processes," "processing," "processed," and "processor" may all be converted to the root form "process." Similarly, the term "devices" may be converted to the root form "device." Thus, when adding terms to the list of unique terms, client device 210 may convert the terms "processing device," "processed devices," and "processor device" into the root form "process device." Client device 210 may add the root term "process device" to the list of unique terms.

Client device 210 may generate a term corpus may by generating a data structure that stores terms extracted from the text, in some implementations. For example, client device 210 may generate a list of terms TermList of size t (e.g., with t elements), where t is equal to the number of unique terms in the text (e.g., where unique terms list TermList=[term$_1$, term$_2$, . . . , term$_t$]). Additionally, or alternatively, client device 210 may store, in the data structure, an indication of an association between a term and a tag associated with the term.

Client device 210 may use the list of unique terms to infer type classifications for terms in the text (e.g., terms in the list of unique terms), as described in more detail elsewhere herein. In this way, client device 210 may prepare a list of terms to be processed, rather than processing all of the terms in the text. This technique may save processing time.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
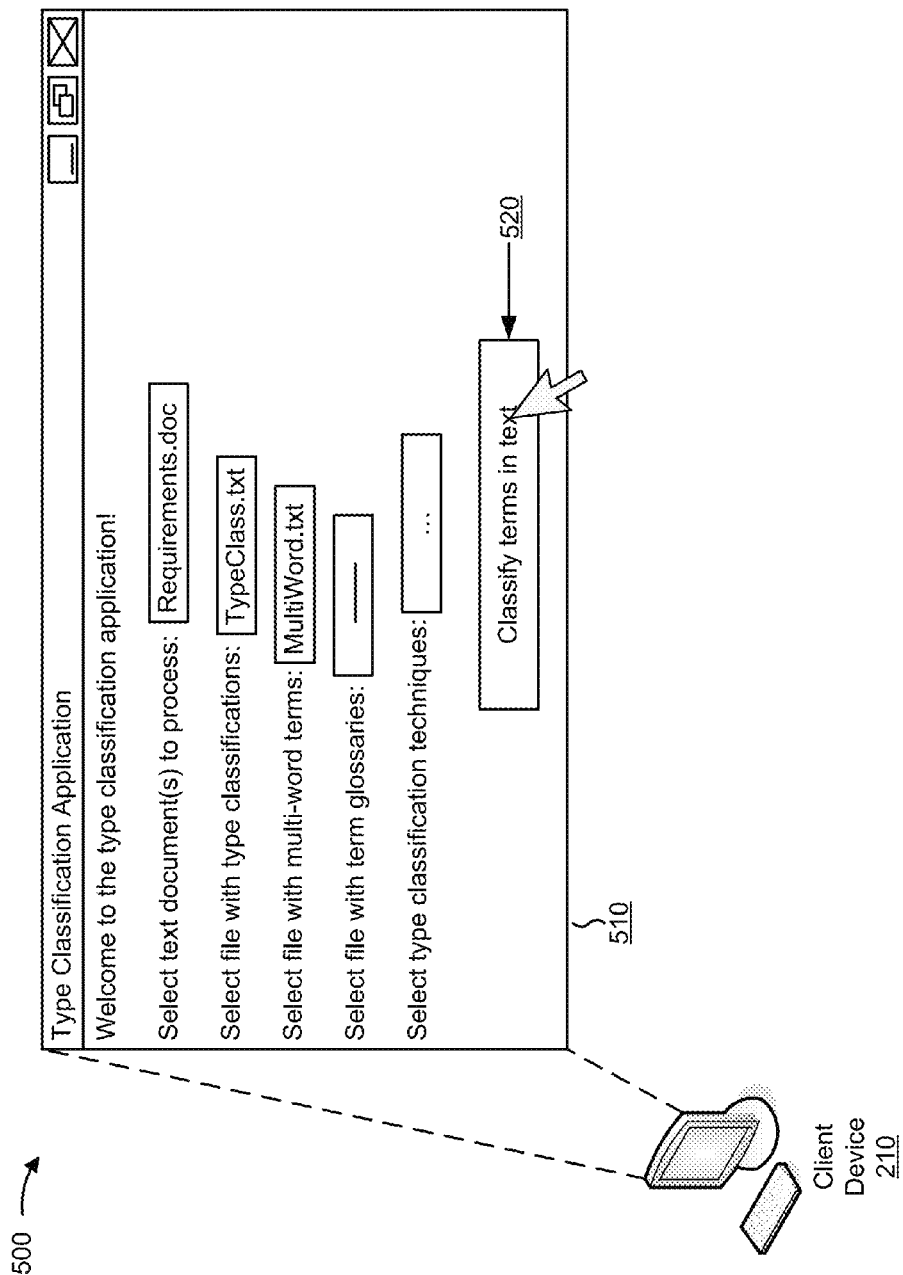
FIGS. 5A and 5B are diagrams of an example implementation relating to the example process shown in FIG. 4.
Figure 5B:
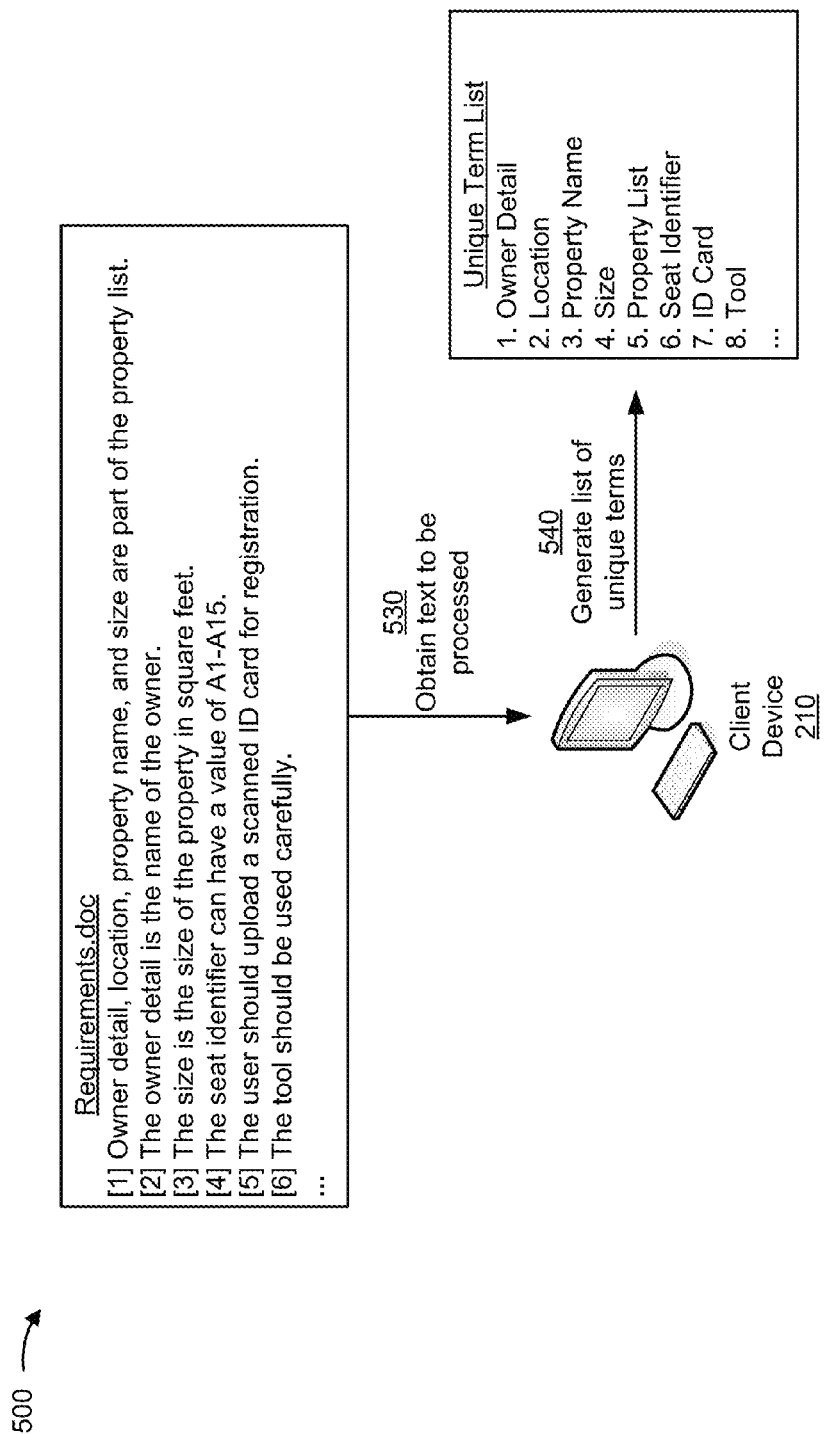

FIGS. 5A and 5B are diagrams of an example implementation 500 relating to example process 400 shown in FIG. 4. FIGS. 5A and 5B show an example of preparing text for processing to infer type classifications of terms in the text.

As shown in FIG. 5A, and by reference number 510, client device 210 provides (e.g., for display) a type classification application via which a user may specify options to be applied by client device 210 when inferring type classifications for terms in text. As shown, the user may provide input identifying text to process (e.g., one or more text documents, such as a document entitled "Requirements.doc"), may provide input identifying type classifications to be used to classify terms in the text (e.g., a file shown as "TypeClass.txt"), may provide input identifying multi-word terms to be included in the list of unique terms (e.g., a file shown as "MultiWord.txt"), may provide input identifying a glossary to be used to identify terms in the text or to be used when inferring type classifications (e.g., to determine term definitions, synonyms, antonyms, etc.), and may provide input identifying one or more type classification techniques to be used by client device 210 to infer type classifications for terms in the text.

For example, the user may provide input identifying one or more type classification techniques described in more detail elsewhere herein, such as a name-based analysis, a synonym-based analysis, a context-based analysis, a value-based analysis, a type classification equation analysis, a composite term analysis, a complex term analysis, or the like. Additionally, or alternatively, the user may provide input identifying other options for processing the text and/or providing output based on processing the text, such as whether to calculate and/or provide confidence scores, whether to generate, provide, and/or apply text data, a manner in which output information is to be provided (e.g., for display), etc. As shown by reference number 520, when the user has finished specifying options for processing the text, the user may interact with an input mechanism (e.g., a button, a link, etc.) to cause client device 210 to infer type classifications for terms in the text.

As shown in FIG. 5B, client device 210 processes the text based on the user interaction. As shown by reference number 530, client device 210 obtains the text to be processed based on a text document identified by the user. As shown, assume that the text is a text document entitled "Requirements.doc," and that the text document includes the following six sentences:

[1] Owner detail, location, property name, and size are part of the property list.

[2] The owner detail is the name of the owner.

[3] The size is the size of the property in square feet.

[4] The seat identifier can have a value of A1-A15.

[5] The user should upload a scanned ID card for registration.

[6] The tool should be used carefully.

As shown by reference number 540, client device 210 processes the text document to generate a list of unique terms. As shown, assume that client device 210 determines the following eight terms from the six sentences included in the requirements document:

1. Owner Detail
2. Location
3. Property Name
4. Size
5. Property List
6. Seat Identifier
7. ID Card
8. Tool Client device 210 may apply one or more type classification techniques to terms included in this list of unique terms, as described in more detail elsewhere herein. By generating the list of unique terms, client device 210 may process the text more efficiently than if the text were processed without first creating the list of unique terms.

As indicated above, FIGS. 5A and 5B are provided merely as an example. Other examples are possible and may differ from what was described with regard to FIGS. 5A and 5B.

Figure 6:
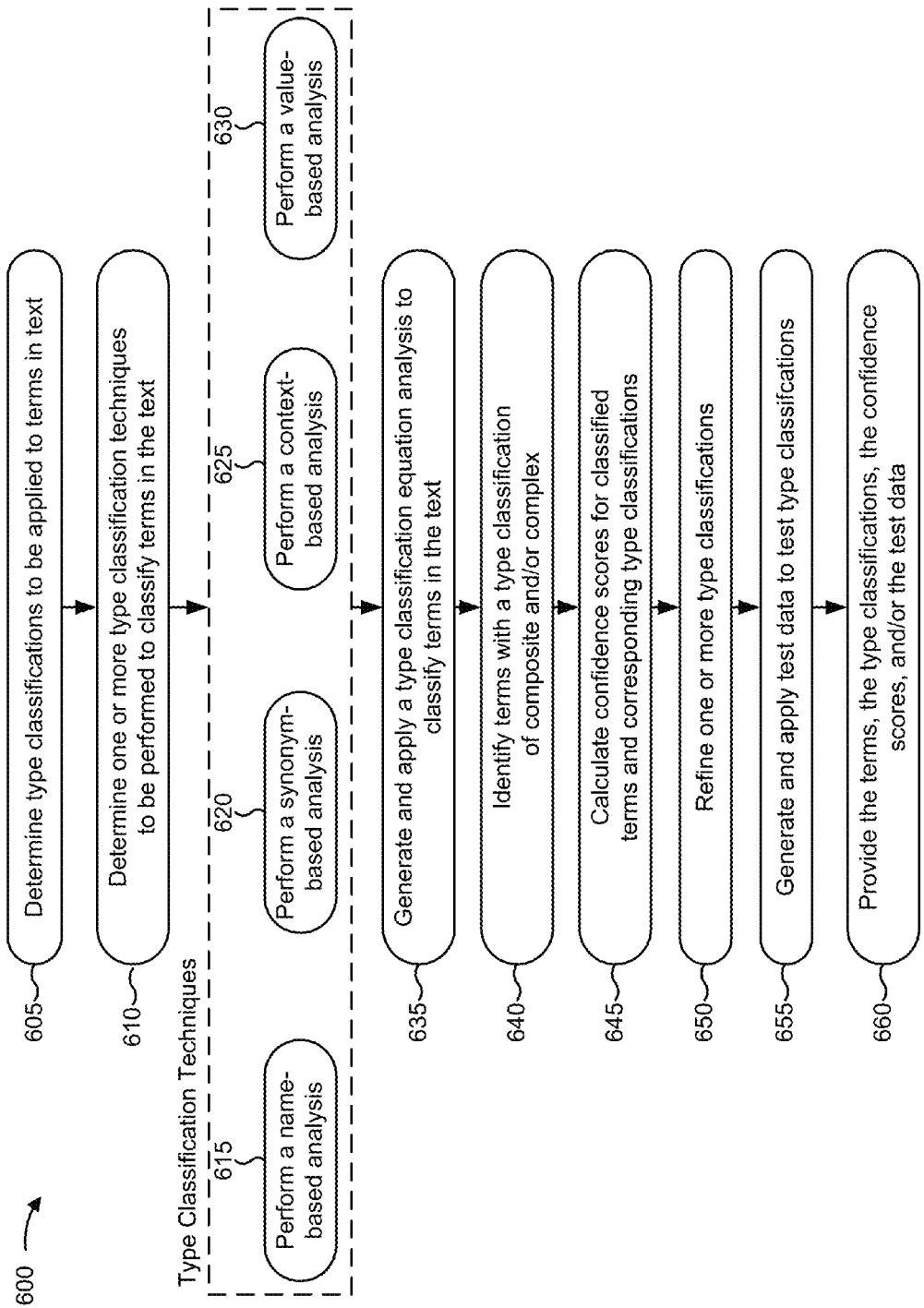
FIG. 6 is a flow chart of an example process for processing text to infer type classifications of terms in the text.

FIG. 6 is a flow chart of an example process 600 for processing text to infer type classifications of terms in the text. In some implementations, one or more process blocks of FIG. 6 may be performed by client device 210. In some implementations, one or more process blocks of FIG. 6 may be performed by another device or a group of devices separate from or including client device 210, such as server device 220.

As shown in FIG. 6, process 600 may include determining type classifications to be applied to terms in text (block 605). For example, client device 210 may determine (e.g., based on input from a user and/or another device) type classifications to be applied to terms in the text. For example, a user may input information identifying the type classifications and/or a memory location at which a file, that identifies the type classifications, is stored (e.g., local to and/or remote from client device 210). Type classifications are described in more detail above in connection with block 410 of FIG. 4. In some implementations, client device 210 may apply the type classifications to terms included in a list of unique terms (e.g., a unique term list), determined as described elsewhere herein.

As further shown in FIG. 6, process 600 may include determining one or more type classification techniques to be performed to classify terms in the text (block 610). For example, client device 210 may determine one or more type classification techniques to be performed to classify terms in the text using the type classifications. In some implementations, client device 210 may receive user input that specifies the type classification techniques to be performed. Additionally, or alternatively, client device 210 may determine one or more default type classification techniques to be performed (e.g., based on information stored in a data structure). In some implementations, client device 210 may determine the type classification technique(s) based on a characteristic of the text (e.g., a size of the text, contents included in the text, a quantity of text sections in the text, a quantity of terms in the text, a file format of a file that includes the text, etc.).

A type classification technique may include a name-based analysis, a synonym-based analysis, a context-based analysis, a value-based analysis, a type classification equation analysis, a primitive type analysis, a composite type analysis, a complex type analysis, etc. Except as otherwise described herein, client device 210 may perform a single type classification technique, or may perform any combination of multiple type classification techniques. When performing a combination of multiple type classification techniques, client device 210 may perform the multiple type classification techniques in any order, except as otherwise described herein.

In some implementations, when client device 210 classifies a term using a type classification technique (e.g., in a sequence of type classification techniques to potentially be performed), client device 210 may prevent another type classification technique (e.g., later in the sequence) from being applied to that term. Additionally, or alternatively, client device 210 may classify a term using multiple type classification techniques (e.g., which may identify a same type classification or a different type classification). In some implementations, client device 210 may apply type classification techniques in a particular order, such as a name-based analysis, a synonym-based analysis, a context-based analysis, and a value-based analysis (or a name-based analysis, a context-based analysis, a synonym-based analysis, and a value-based analysis, etc.). Client device 210 might only proceed to a next type classification in the sequence if none of the preceding type classification techniques were able to successfully classify a term.

As further shown in FIG. 6, process 600 may include performing a name-based analysis (block 615). For example, client device 210 may perform a name-based analysis by comparing a term to one or more type indicator lists corresponding to one or more type classifications. A type indicator list may include a list of type indicators (e.g., terms) associated with a particular type classification. If the term matches a type indicator included in the type indicator list, then client device 210 may classify the term using the particular type classification. If the term does not match any type indicators in the type indicator list, then client device 210 may not classify the term using the particular classification.

As an example, the type classification "integer" may be associated with type indicators of zip code, pin code, record number, number (or no.), weight, statistic, size, quantitative, quantity, integer, integers, sum, total, long, short, text size, size of name, size of question, size of answer, size of story, number of hours, number of days, number of weeks, number of minutes, number of seconds, total days, total hours, total weeks, length, password length, story length, answer length, question length, address length, URL length, length of, length of story, length of answer, length of question, length of address, length of URL, sum of, sum of percentage, sum of age, sum of months, sum of weeks, total duration, scale, size of, number of (or no. of), index, relative position, etc. Thus, client device 210 may classify the term "zip code" as an integer type because this term is included in the type indicator list for the integer type classification.

As another example, the type classification "string" may be associated with type indicators of name, username, city, location, country, question, answer, text, story, definition, information, FAQ, ownership, system log, search data, true definition, false definition, long name, long answer, long question, long story, long definition, type of city, type of country, short name, short answer, short question, short definition, short story, true story, true answer, true question, password, short password, long password, language, content, etc. Thus, client device 210 may classify the term "name" as a string type because this term is included in the type indicator list for the string type classification.

As another example, the type classification "file" may be associated with type indicators of file, xml, excel, xlsx, txt, text file, text document, document, etc. Thus, client device 210 may classify the term "file" as a file type because this term is included in the type indicator list for the file type classification.

As another example, the type classification "enumerator" may be associated with type indicators of status, type, range, type of name, type of question, type of answer, type of currency, type of money, status of money, type of activity, name type, question type, answer type, currency type, money type, activity type, false types, true types, false type, true type, etc. Thus, client device 210 may classify the term "status" as an enumerator type because this term is included in the type indicator list for the enumerator type classification.

As another example, the type classification "float" (e.g., "floating point") may be associated with type indicators of price, rate, money, currency, total price, total money, sum of price, state money, question of price, question of money, true price, false currency, sum of money, percentage, percent, fraction, ratio, proportion, area, volume, surface area, breadth, height, length, etc.

As another example, the type classification "time" may be associated with type indicators of am, pm, o'clock, noon, period, hour, minute, second, year, month, week, time, interval, duration, old, day, long noon, long time, long hour, long week, long day, long duration, short noon, short time, short hour, short week, short day, short duration, question week, question month, story week, story month, information week, information month, moment, instant, etc.

As another example, the type classification "date" may be associated with type indicators of date, date of birth, DOB, day, etc. As another example, the type classification "multimedia" may be associated with type indicators of image, MMS, voice mail, voice message, picture, photo, sound file, etc. As another example, the type classification "Boolean" may be associated with type indicators of yes, no, gender, true, false, flag, etc. As another example, the type classification "age" may be associated with type indicators of age, old, etc. As another example, the type classification "null" may be associated with type indicators of null, nil, blank, empty, etc. As another example, the type classification "URL" may be associated with type indicators of URL, link, hyperlink, Long URL, short URL, etc.

In some implementations, client device 210 may perform a name-based analysis by comparing a subset of a term (e.g., one or more words included in a multi-word term) to one or more type indicator lists corresponding to one or more type classifications. If one or more words, included in a multi-word term, match a type indicator included in the type indicator list, then client device 210 may classify the term using a type classification associated with the type indicator list. In some implementations, client device 210 may process every word, included in a term, using the name-based analysis (e.g., may compare every word to the terms in the type indicator lists to determine whether there is a match). Client device 210 may prepare a word for processing, in some implementations, such as by converting the word to a root form, converting the word to all lowercase characters, etc.

If different words, included in a term, match different type classifications, then client device 210 may classify the term using multiple potential type classifications. For example, if a first word, included in a term, matches a first type indicator associated with a first type classification, and a second word, included in the term, matches a second type indicator associated with a second type classification, then client device 210 may associate the term with the first type classification and the second type classification (e.g., as potential type classifications). For example, client device 210 may classify the term "user image type" as a multimedia type because the word "image" is included in the type indicator list for the multimedia type classification, and may further classify the term as an enumerator type because the word "type" is included in the type indicator list for the enumerator type classification. In some implementations, client device 210 may further process the term to determine one of the potential type classifications with which the term is more likely to be associated (e.g., based on a quantity of words that match a particular type classification, based on a confidence score associated with a type classification, etc.).

As further shown in FIG. 6, process 600 may include performing a synonym-based analysis (block 620). For example, client device 210 may perform a synonym-based analysis by comparing a synonym of a term, or a synonym of a word included in the term, to one or more type indicator lists corresponding to one or more type classifications. If the synonym matches a type indicator included in a type indicator list associated with a particular type classification, then client device 210 may classify the term using the particular type classification. If the synonym does not match any type indicators in the type indicator list, then client device 210 may not classify the term using the particular classification. In some implementations, client device 210 may receive information identifying correspondences between terms/words and synonyms of the terms/words. For example, client device 210 may use a glossary, a dictionary, a thesaurus, a lexical database (e.g., WordNet), etc. to identify the synonyms.

In some implementations, a synonym may be associated with a frequency score (e.g., a frequency count) for a word, and client device 210 may receive information identifying the frequency score (e.g., identified in a lexical database). A frequency score may indicate how likely a particular synonym is to be associated with a particular word, how frequently a particular synonym is used (e.g., in a natural language, such as English), etc. In some implementations, when client device 210 does not receive information identifying frequency scores, client device 210 may set a frequency score for each synonym to be equal to one.

Client device 210 may perform the synonym-based analysis by performing a name-based analysis, described above, on each of the identified synonyms associated with a term (e.g., each synonym associated with each word in the term). For example, client device 210 may generate a synonym list of all synonyms associated with a particular term, and may apply a name-based analysis to each synonym in the synonym list. Based on performing the name-based analysis, client device 210 may determine one or more type classifications associated with the term. Additionally, or alternatively, client device 210 may generate a matching synonyms list that includes all (or a subset of) synonyms, from the synonym list, that indicate a type classification (e.g., all synonyms, or a subset of synonyms, that are type indicators for a type classification).

In some implementations (e.g., when client device 210 identifies frequency scores for synonyms), client device 210 may determine a type frequency score for a type classification. For example, client device 210 may determine a type frequency score, for a particular type classification, by summing frequency scores associated with each synonym that matches a type indicator for the particular type classification. In this case, client device 210 may classify a word (or a term) using the type classification with the highest type frequency score (e.g., as compared to other type frequency scores associated with other type classifications). If multiple type classifications have the same highest type frequency score, client device 210 may classify the word using more than one type classification.

Client device 210 may classify a single-word term based on the type classification determined for a synonym of the single word. For example, assume that client device 210 applies a name-based analysis to the single-word term "emplacement," but cannot classify this term because the term "emplacement" is not a type indicator for any type classification. In this case, client device 210 may apply a synonym-based analysis, and may determine that the term "location" is a synonym for the term "emplacement." Because the synonym "location" is a type indicator for a string type, client device 210 may classify the term "emplacement" as a string type.

As another example, assume that the term "emplacement" is associated with two synonyms, "location" and "position." Further, assume that "location" is a type indicator for a string type, and "position" is a type indicator for a float type. In some implementations (e.g., where client device 210 does not use frequency scores, where the frequency scores for "location" and "position" are equal, etc.), client device 210 may classify the term "emplacement" using both the string type and the float type (e.g., and/or may further process the term to determine whether "emplacement" is more likely to be associated with a string type or a float type). Alternatively (e.g., where client device 210 uses frequency scores, where the frequency scores are not equal, etc.), client device 210 may classify the term "emplacement" based on whether the synonym "location" or the synonym "position" has a higher frequency score. For example, client device 210 may classify "emplacement" as a string type when "location" has a higher frequency score, and may classify "emplacement" as a float type when "position" has a higher frequency score.

Client device 210 may classify a multi-word term using one or more type classifications determined for each word included in the multi-word term. For example, assume that client device 210 applies a name-based analysis to each word in the multi-word term "top mass score." Further, assume that client device 210 determines that the word "height" is a synonym of the word "top," and that height is a type indicator for the float type. Further, assume that client device 210 determines that the word "volume" is a synonym of the word "mass," and that volume is a type indicator for the float type.

Further, assume that client device 210 determines that the words "grade" and "account" are synonyms of the word "score." In this case, assume that "grade" is a type indicator for the enumerator type, and "account" is a type indicator for the string type. Finally, assume that "grade" has a higher frequency score than "account."

In some cases, client device 210 may classify "top mass score" using every identified type classification, such as the float type (e.g., determined for the synonyms "height" and "volume"), the enumerator type (e.g., determined for the synonym "grade"), and the string type (e.g., determined for the synonym "account"). In some cases, client device 210 may classify "top mass score" using one type classification for each word in the multi-word term, such as the float type (e.g., determined using the synonyms of "top" and "mass") and the enumerator type (e.g., determined using the synonyms of "score," where "grade" has a higher frequency score than "account," resulting in a selection of the enumerator type associated with "grade"). In some cases, client device 210 may classify "top mass score" using a single type classification, such as the float type (e.g., because two words in "top mass score" resulted in a selection of the float type, and only one word resulted in a selection of the enumerator type; because the type frequency score associated with the float type is greater than the type frequency score associated with the enumerator type; etc.). In this way, client device 210 may customize a manner in which terms are classified based on user preferences.

As further shown in FIG. 6, process 600 may include performing a context-based analysis (block 625). For example, client device 210 may perform a context-based analysis by comparing a modifier of a term to one or more type indicator lists corresponding to one or more type classifications. If the modifier matches a type indicator included in a type indicator list associated with a particular type classification, then client device 210 may classify the term using the particular type classification. If the modifier does not match any type indicators in the type indicator list, then client device 210 may not classify the term using the particular classification. A modifier may include, for example, an adjective (e.g., identified by a part-of-speech tag of JJ, JJR, JJS, etc.). In some implementations, the modifier may precede a term in the text (e.g., within a particular proximity, such as a threshold quantity of words or characters), or may follow a term in the text. Client device 210 may prepare a modifier for processing, in some implementations, such as by converting the modifier to a root form, converting the modifier to all lowercase characters, etc.

As an example, assume that client device 210 applies a context-based analysis to the term "ID proof." Further, assume that the term "ID proof" is modified by the word "scan" (e.g., assume that "scanned ID proof," "scanning the ID proof," or the like, appears in the text). Further, assume that "scan" is a type indicator for a multimedia type. In this case, client device 210 may classify the term "ID proof" as a multimedia type.

In some cases, a term may be modified by multiple modifiers. For example, assume that "ID proof" is modified by the words "scan" and "number" (e.g., "scanned ID proof," "numbered ID proof," "scanned and numbered ID proof," etc.). Further, assume that "scan" is a type indicator for a multimedia type, and "number" is a type indicator for a numeric type. In this case, client device 210 may classify the term "ID proof" using both the multimedia type and the numeric type. Additionally, or alternatively, client device 210 may classify the term "ID proof" based on which modifier or modifiers modifies "ID proof" more often in the text. For example, if "scan" modifies "ID proof" ten times in the text, and "number" modifies "ID proof" once in the text, client device 210 may classify "ID proof" as a multimedia type.

As further shown in FIG. 6, process 600 may include performing a value-based analysis (block 630). For example, client device 210 may perform a value-based analysis by comparing a value, associated with a term in the text, to one or more type indicator lists and/or type indicator patterns corresponding to one or more type classifications. If the value matches a type indicator included in a type indicator list associated with a particular type classification, or the value matches a type pattern included in a type pattern list associated with the particular type classification, then client device 210 may classify the term using the particular type classification. If the value does not match any type indicators in the type indicator list or any pattern indicators in the pattern indicator list, then client device 210 may not classify the term using the particular classification. A pattern indicator list may include a list of type patterns (e.g., a particular sequence and/or combination of characters, words, terms, etc. that appear in the text) associated with a particular type classification.

Client device 210 may perform the value-based analysis by, for example, identifying one or more values included in the text, determining type classifications associated with those values, determining one or more terms associated with those values, and inferring type classifications for the terms based on the type classifications associated with the values.

In some implementations, client device 210 may identify a value in the text as a set of characters that appear between delimiters (e.g., between single quotes, between double quotes, within parenthesis, within brackets, within braces, within slashes, etc., such as {true, false}), as a set of characters associated with a range indicator (e.g., characters that surround a hyphen, a dash, a colon, etc., such as A1-A10), as terms associated with a value-indicating tag (e.g., a VALUE tag; a particular part-of-speech tag, such as NN, JJ, CD, VBN, VBZ, IN, NNP, LS, MD, etc.), or the like. Client device 210 may prepare a value for processing, in some implementations, such as by converting the value to all lowercase characters, etc.

Additionally, or alternatively, client device 210 may identify a value in the text based on a pattern (e.g., a particular sequence and/or combination of characters, words, terms, etc. that appear in the text), such as a regular expression (regex), a basic regular expression, an extended regular expression, etc. For example, client device 210 may identify values, and/or type classifications associated with the values, using POSIX notation, as shown in the following tables:

Example POSIX Patterns for Words Having a
"CD" Part-of-Speech Tag

| Type Classification | POSIX Notation Pattern | Examples |
| --- | --- | --- |
| Float | ([0-9]*\.[0-9]+)\|([$,£]+[0-9]*\.?[0-9]*) | 11.19, $9.00 |
| Integer | ([A-Z0-9]+)\|( [a-zA-Z]+) | 18, 1ABC, AB2CD |
| Time | (([01]?[0-9])\|(2[0-3])):[0-5][0-9] | 12:00 |

Example POSIX Patterns for Words Having a
Part-of-Speech Tag Other than "CD"

| Type Class | POSIX Notation Pattern | Examples |
| --- | --- | --- |
| Float | "[0-9]*\.?[0-9] | 9.18 |
| Email | ^[A-Za-z0-9_]+([\._]*[A-Za-z0-9]+)@[A-Za-z0-9]+((\.[A-Za-z0-9]{2,})+$ | abv@yahoo.com |
| String | ('[a-zA-Z0-9]*[']?)\|([A-Za-z0-9]*"[A-Za-z0-9]+["]?)\|([0-9a-z]+) | 'Abc', "Abc 23", 1abc23 |
| Multimedia | ([ \s]*(\.?(?i)(bmp\|jpg\|gif\|png\|tiff\|jpeg))$) | Abc.bmp |
| File | ([ \s]*(\.?(?i)(txt\|doc\|docx\|csv\|pdf\|xls\|xlsx)$) | Bmp |
| Enumerator | ((([A-Z]+)([0-9]+)(-\|:)\1[0-9]+)\|([0-9]+([A-Z]*)(-\|:)[0-9]+\1)\|([A-Z]([0-9]+)(-\|:)[A-Z]\1)\|(([0-9]*)[A-Z](-\|:)\1[A-Z])) | A1-A10, 1A:10A, 1-10, A1:Z1, A-Z |

Example POSIX Patterns for Dates

| Type Class | POSIX Notation Pattern | Examples |
| --- | --- | --- |
| Date | (January\|Jan\|February\|Feb\|March\|Mar\|April\|Apr\|May\|June\|Jun\|July\|Jul\|August\|Aug\|September\|Sep\|Sept\|October\|Oct\|November\|Nov\|December\|Dec\|)\d{1,2}[, ]*[\d{2,4}]* | September 12, 2014 |
| Date | \d{1,4}-\d{1,4}-\d{1,4} | 1-12-14 |
| Date | \d{1,4}\\\d{1,4}\\\d{1,4} | 14\12\1 |
| Date | \d{1,4}/\d{1,4}/\d{1,4} | 1/12/14 |
| Date | \d{1,2}[st nd th rd]*\w{3,}[, ]*[\d{2,4}]* | 1st Jan, 12 |
| Date | \w{3,}\d{1,2}([, ])*[\d{2,4}]* | Jan 1, 2014 |

Client device 210 may associate a value with a term based on a proximity between the value and the term in the text (e.g., a distance between the value and the term, measured in characters, words, terms, etc.), and may classify the term based on the type classification associated with the value. In some implementations, client device 210 may associate a value with a term in the same sentence as the value. For example, if a value appears in the same sentence as a term, then client device 210 may classify the term using the type classification associated with the value. Additionally, or alternatively, if a value appears in the same sentence as multiple terms, then client device 210 may classify all of the terms using the type classification associated with the value. Alternatively, client device 210 may classify a term using a type classification associated with a value that appears closest in proximity to the term (e.g., closest in proximity before the term, closest in proximity after the term, closest in proximity before or after the term, etc.).

If multiple values appear in a sentence, then client device 210 may classify a term in the sentence using a type classification of each value, in some implementations. Additionally, or alternatively, client device 210 may classify the term using a type classification of a value that is closest in proximity to the term (e.g., before, after, before or after, etc.). In some implementations, client device 210 may classify terms that precede a value (e.g., but that follow another value; that follow a particular delimiter, such as a period, a comma, or the like; etc.) using the type classification associated with the value. In some implementations, client device 210 may classify terms that follow a value (e.g., but that precede another value; that precede a particular delimiter, such as a period, a comma, or the like; etc.) using the type classification associated with the value.

As an example, assume that the text includes the sentence "If a user enters a loan amount of $5000 and a deposit duration of 5 years, then the interest rate will be 7.8%." Further, assume that client device 210 determines that this sentence includes the terms "loan amount," "deposit duration," and "interest rate," and the values "$5000," "5," and "7.8%." Assume that client device 210 determines that "$5000" is a currency type, "5" is an integer type, and "7.8%" is a float type. In this case, client device 210 may associate each value with a term that precedes that value in the sentence, but that does not precede another value in the sentence. Thus, client device 210 may associate "$5000" with "loan amount" and may classify "loan amount" as a currency type, may associate "5" with "deposit duration" and may classify "deposit duration" as an integer type, and may associate "7.8%" with "interest rate" and may classify "interest rate" as a float type.

As further shown in FIG. 6, process 600 may include generating and applying a type classification equation analysis to classify terms in the text (block 635). For example, client device 210 may generate a set of type classification equations to classify terms in the text (e.g., terms that could not be classified using one or more of the term classification techniques described above with respect to blocks 615-630). A type classification equation may indicate a relationship between at least two terms, such that a type classification of a first term can be inferred based on a type classification of a second term. In some implementations, the type classification of the first term may be known, and client device 210 may associate the type classification of the second term to be the same as the type classification of the first term. In some implementations, the type classification of both terms may be unknown. In this case, client device 210 may generate a system of type classification equations, and may solve the system of type classification equations (e.g., using one or more techniques for solving systems of equations) to determine the type classifications of multiple terms. In some implementations, where the first term is classified using multiple type classifications, client device 210 may classify the second term using the multiple type classifications.

Client device 210 may generate a type classification equation by identifying a type-preserving operator in the text, and by identifying two (or more) terms associated with the type-preserving operator. A type-preserving operator may include a set of characters, words, phrases, etc., that indicate that a first term and a second term are associated with the same type classification (or with two different type classifications that share a relationship indicated by the type-preserving operator). In some implementations, client device 210 may receive input (e.g., from a user and/or another device) that identifies a set of type-preserving operators.

As an example, assume that the text includes the sentence "The insurance term must be greater than ten years." Further, assume that client device 210 has identified "greater than" as a type-preserving operator, and has identified the terms "insurance term" and "ten years" as terms associated with the "greater than" type-preserving operator. Finally, assume that client device 210 has determined (e.g., using name-based analysis with "years" as a type indicator for an integer type) that "ten years" is an integer type. Based on the type-preserving relationship between "ten years" and "insurance" term (e.g., indicated by the type-preserving operator "greater than"), client device 210 may classify "insurance term" as an integer type.

Examples of type-preserving operators may include, but are not limited to, greater, greater than, greater than or equal to, lesser, less than, lesser than, less than or equal to, equal to, than, larger, larger than, smaller, smaller than, bigger, bigger than, earlier, earlier than, later, later than, wider, wider than, taller, taller than, deeper, deeper than, heavier, heavier than, lighter, lighter than, stronger, stronger than, weaker, weaker than, clearer, clearer than, longer, longer than, shorter, shorter than, higher, higher than, lower, lower than, faster, faster than, slower, slower than, warmer, warmer than, hotter, hotter than, colder, colder than, at least, at most, more, less, more than, no more than, no less than, before, prior, prior to, after, multiplied, multiplied by, multiple, multiple of, multiplication of, divide, divided by, fraction of, added to, sum of, addition of, subtracted from, minus, plus, times, increase, increment, decrease, decrement, total of, as many, as many as, as much, as much as, or the like.

In some implementations, client device 210 may generate one or more type equations based on one or more patterns that include a type-preserving operator. Example patterns may include, but are not limited to, the pattern shown below. For example, client device 210 may apply a type classification equation analysis to the sentence "The number of registered devices should be smaller than the total number of devices" using the following pattern:

$Pattern_1 := X[MD][VB][\text{at least}]NumCom\ Y$ $NumCom :=$

Greater than | > | Greater than or equal to | >= | Less than | < |

Less than or equal to | <= | equal to | = |

-continued

Larger than | Smaller than | at least | at most

MD: = (must | should | can | could | would | will | may | might)[be | not be]

VB: = is

Type Equation$_1$: Type($X$) = Type($Y$) =

[Numeric(Integer | float) | Date | Time | Age]

As another example, client device 210 may apply a type classification equation analysis to the sentence "An employee at Level A should get at least 2 times more variable incentive than base salary" using the following pattern:
Pattern$_2$:=[at least] Z times (more | less) X than Y
Z=Number Type($X$)=Type($Y$)=[Numeric (Integer | float) | Date-
| Time | Age]    Type Equation$_2$:

As another example, client device 210 may apply a type classification equation analysis to the sentence "The CPU should be 5 times faster than the dual core" using the following pattern:
Pattern$_3$:=X[MD][VB] [at least] Z times JJ than Y
Z=Number,
JJ=Comparative Adjective Type($X$)=Type($Y$)    Type Equation$_3$:

As another example, client device 210 may apply a type classification equation analysis to the sentence "The usage date should not exceed more than 9 months from the date of manufacturing" using the following pattern:
Pattern$_4$:=X[MD][VB] [at least] [Z times] (More than | no more than) Y Type($X$)=Type($Y$)=[Numeric (Integer | float) | Date-
| Time | Age]    Type Equation$_4$:

As another example, client device 210 may apply a type classification equation analysis to the sentence "The user arrival time should be 2 hours before the departure time" using the following pattern:
Pattern$_5$:=X[MD][VB]] [more than | less than] [ZT] (before- | prior to | earlier than | after | later than) Y
T=unit of (time | date)

Type($X$)=Type($Y$)=[Date | Time]    Type Equation$_5$:

As another example, client device 210 may apply a type classification equation analysis to the sentence "The sun size on Saturn appears to be 100 times lesser than the sun size on Earth" using the following pattern:
Pattern$_6$:=X[MD] [VP]Z times (less[er] | more) than Y
VB:=verb phrase Type($X$)=Type($Y$)=Numeric(Float | Integer)    Type Equation$_6$:

As another example, client device 210 may apply a type classification equation analysis to the sentence "The transaction password should be stronger than the login password" using the following pattern:
Pattern$_7$:=X[MD][VB] JJR than Y Type($X$)=Type($Y$)=String | Multimedia | Number(Floa-
t | Integer)    Type Equation$_7$:

As another example, client device 210 may apply a type classification equation analysis to the sentence "Height in inches is height in centimeters multiplied by 2.54" using the following pattern:

Pattern$_8$:=X[MD][VB][Z](multiplied by | multiple of | divided by | fraction of | added to | subtracted from | times) Y Type($X$)=Type($Y$)=Number(Float | Integer)    Type Equation$_8$:

As another example, client device 210 may apply a type classification equation analysis to the sentence "Salary increases by 5 times" using the following pattern:
Pattern$_9$:=X(Increase[s | ed] | Incremented | Decrease[s | ed] | Decremented) by Y Type($X$)=Type($Y$)=Number(Float | Integer) | Date | Time Type Equation$_9$:

As another example, client device 210 may apply a type classification equation analysis to the sentence "India Standard Time is 5:30 added to Greenwich Mean Time" using the following pattern:

Pattern$_{10}$: = $X[MD][VB]X_1$(added to | substracted from)$X_2$

Type Equation$_{10}$: Type($X$) = Type($X_1$) =

Type($X_2$) = Numeric(Float | Integer) | Date | Time

As another example, client device 210 may apply a type classification equation analysis to the sentence "Taxable salary is the sum of base salary and bonus" using the following pattern:
Pattern$_{11}$:=X[MD][VB] (sum of | total of | addition of | multiplication of) $X_1$, $X_2$, . . . [,] and $X_k$ Type($X_1$)= . . . =Type($X_k$)=Number(Float | Integer)
| Date | Time    Type Equation$_{11}$:

As another example, client device 210 may apply a type classification equation analysis to the sentence "There were 3 times as many male voters as female voters" using the following pattern:
Pattern$_{12}$:=Z times as many $X_1$ as $X_2$ Type($X_1$)=Type($X_2$)=Number(Float | Integer)    Type Equation$_{12}$:

As another example, client device 210 may apply a type classification equation analysis to the sentence "The user's chances of winning are 2 times as many as the system's chances of winning" using the following pattern:
Pattern$_{13}$:=X[VB] Z times [as many as | as much as]Y Type($X$)=Type($Y$)    Type Equation$_{13}$:

As another example, client device 210 may apply a type classification equation analysis to the sentence "The actual weight is 4 kilograms less than 2 times the display weight" using the following pattern:
Pattern$_{14}$:=X(is | are)$Z_1$ (less | more) than $Z_2$ times Y
$Z_1$,$Z_2$=Number Type($X$)=Type($Y$)=Number(Float | Integer) | Age    Type Equation$_{14}$:

As another example, client device 210 may apply a type classification equation analysis to the sentence "The rope should be 5 centimeters longer than the rod" using the following pattern:
Pattern$_{15}$:=X[MD][VB] [at least]Z A JJR than Y
Z∈Number Type($X$)=Type($Y$)=Number(Float | Integer)    Type Equation$_{15}$:

The above type classification pattern (Pattern$_{15}$) may be used where the type-preserving operator includes a comparative adjective (e.g., identified by JJR part-of-speech tag). The value of "A" may represent a unit type, such as a distance unit (e.g., inch, centimeter, etc.), a weight or mass unit (e.g., gram, pound, kilogram, ounce, etc.), a speed or velocity unit (e.g., meter per second, mile per hour, etc.), a frequency unit (e.g., hertz, megahertz, gigahertz, cycle per second, etc.), a temperature unit (e.g., degrees Centigrade, degrees Fahrenheit, etc.), or the like.

As further shown in FIG. 6, process 600 may include identifying terms with a type classification of composite and/or complex (block 640). For example, client device 210 may identify a term as a composite type based on one or more analysis techniques described above. A composite type may be used to classify a term that represents one or more other terms. As an example, client device 210 may perform a name-based analysis by comparing a term to a type indicator list corresponding to a composite type classification. If the term matches a type indicator included in the type indicator list, then client device 210 may classify the term using the composite type classification. If the term does not match any type indicators in the type indicator list, then client device 210 may not classify the term using the composite classification.

As an example, the type classification "composite" may be associated with type indicators of table, report, page, screen, list, invoice, form, widget, address, contents of, group of, group, graph, object, dashboard, graphical, fields of, long address, short address, timeline, detail, database, address, or the like. Thus, client device 210 may classify the term "user list" as a composite type because this term is included in the type indicator list for the composite type classification.

Additionally, or alternatively, client device 210 may identify a term as a constituent type based on one or more analysis techniques described above. A term that is a constituent type may be represented as a constituent of a term that is a composite type. A composite term may be associated with one or more constituent terms, and a constituent term may be associated with one or more composite terms. As an example, client device 210 may perform a name-based analysis by comparing a term to a type indicator list corresponding to a constituent type classification. If the term matches a type indicator included in the type indicator list, then client device 210 may classify the term using the constituent type classification. If the term does not match any type indicators in the type indicator list, then client device 210 may not classify the term using the constituent classification. Additionally, or alternatively, client device 210 may classify constituent terms using one or more primitive types.

As an example, the type classification "constituent" may be associated with type indicators of have, has, consists of, consist of, consisted of, further consisted of, further consists of, composed of, contains, include, includes, contain, comprise, comprise of, comprises, comprised of, composed of, be composed of, involve, made up of, part of, constituent of, constituents of, contents of, following, appear in, contained in, involved in, or the like. In some cases, these constituent type indicators may indicate whether the constituents appear before, after, or before or after the composite term. For example, the type indicators part of, constituents of, constituent of, contents of, appear in, contained in, and involved in may indicate that the composite entity appears after the constituent entities in the text.

Additionally, or alternatively, client device 210 may identify a term as a complex type based on one or more analysis techniques described above. A complex type may be used to classify a term for which a type classification cannot be easily inferred as another type. As an example, client device 210 may perform a name-based analysis by comparing a term to a type indicator list corresponding to a complex type classification. If the term matches a type indicator included in the type indicator list, then client device 210 may classify the term using the complex type classification. If the term does not match any type indicators in the type indicator list, then client device 210 may not classify the term using the complex classification.

As an example, the type classification "complex" may be associated with type indicators of data, signature, property, library, field, criteria, criterion, result, event, activity, process, or the like.

As further shown in FIG. 6, process 600 may include calculating confidence scores for classified terms and corresponding type classifications (block 645). For example, client device 210 may generate a confidence score that indicates a likelihood that a particular term is associated with a particular type classification. In some implementations, a confidence score may range from 0 (or 0%) to 1 (or 100%), with 0 indicating no confidence (or a very low confidence) and 1 indicating complete confidence (or very high confidence). Additionally, or alternatively, client device 210 may calculate a confidence score based on a type classification technique used to determine an association between a term and a type classification (e.g., a name-based analysis, a synonym-based analysis, a context-based analysis, a value-based analysis, etc.).

As an example, when client device 210 determines a type relationship (e.g., between a term and a type classification) using a name-based analysis for a single-word term (e.g., associated with a single type classification), client device 210 may assign a confidence score of 1 to the type relationship (e.g., a high confidence score, or the highest confidence score). In the case of a name-based analysis, specific type indicators are identified as being highly likely to indicate a particular type classification. Thus, client device 210 may assign a high confidence score to the type relationship (e.g., as compared to type relationships determined using other type classification techniques and/or for multi-word terms).

For a name-based analysis of a multi-word term, client device 210 may calculate a confidence score for a type relationship between the multi-word term and a particular type classification based on, for example, a quantity of words included in the multi-word term, a quantity of words that indicate the particular type classification, and/or a weight value. For example, client device 210 may calculate a confidence score for a name-based analysis as follows:

$$\text{Confidence}(T, ty_i) = \frac{\delta n_i}{\delta m + (1-\delta)(n-m)}$$

In the above expression, Confidence(T, $ty_i$) may represent a confidence score for a type relationship between term T and type $ty_i$ (e.g., where term T is classified as being associated with k different type classifications, and i may take a value from 1 to k), n may represent a quantity of words included in the multi-word term, $n_i$ may represent a quantity of those words that indicate a type relationship between term T and $ty_i$, $\delta$ may represent a weight value (e.g., a default weight value, such as a default weight value of 0.75; a weight value input by a user; a weight value that indicates a relative weight of a word that is a type indicator for a name-based analysis as compared to words that do not indicate any type based on applying a name-based analysis; etc.), and m may represent a sum of each $n_i$ value corresponding to each type classification $ty_i$ associated with term T. In other words, m may be represented as follows:

$$m = \Sigma_{i \in [1,k]} n_i$$

As an example, assume that client device 210 applies a name-based analysis to the term "unstructured textual information sources." Further, assume that the words "textual" and "information" are type indicators for the string type, and that "unstructured" and "sources" are not type indicators for any type classification. Thus, client device 210 determines that n=4 (e.g., there are 4 words in the multi-word term), $n_i$=2 for the string type (e.g., there are two terms that indicate the string type), and m=2 (e.g., there are two total type indicators that indicate any type classification). Assume that client device 210 applies a default weight value of δ=0.75 to generate a confidence score of 0.75, as follows:

$$\text{Confidence(unstructured textual information sources, string)} = \frac{0.75*2}{0.75*2 + (0.25)(4-2)} = 0.75$$

For a synonym-based analysis of a term T that includes n words, client device 210 may calculate a confidence score for a type relationship between the term and a particular type classification based on, for example, a quantity of words included in the term, a quantity of words that indicate the particular type classification, a quantity of words that do not indicate any type classification, a frequency score associated with a word and the particular type classification, a sum of frequency scores for a word and all type classifications associated with the word, and/or a weight value. For example, client device 210 may calculate a confidence score for a synonym-based analysis as follows:

$$\text{Confidence}(T, ty_i) = \left[ \frac{\sum_{w \in Z_{ty_i}} \Delta[w, ty_i]}{n-a} \right] * \gamma_s$$

In the above expression, Confidence(T, $ty_i$) may represent a confidence score for a type relationship between term T and type $ty_i$ (e.g., where term T is classified as being associated with k different type classifications, and i may take a value from 1 to k), $$\sum_{w \in Z_{ty_i}} \Delta[w, ty_i]$$

may represent a sum of confidence scores for a type relationship between word w and type $ty_i$ for each word w in term T that indicates type $ty_i$, n may represent a quantity of words included in term T, a may represent a quantity of words in term T that do not indicate any type classification, and $y_s$ may represent a weight value (e.g., a default weight value, such as a default weight value of 0.8; a weight value input by a user; a weight value that indicates a relative weight to be given to the synonym-based analysis as compared to the name-based analysis, such as 0.8; etc.). In some implementations, the value of Δ[w,$ty_i$] may be represented as follows:

$$\Delta[w_i, ty] = \frac{C(w_i, ty)}{\sum_{\forall ty \in S_i''} C(w_i, ty)}$$

In the above expression, Δ[$w_i$, ty] may indicate a confidence score for a type relationship between word $w_i$ and type ty, C($w_i$, ty) may represent a type frequency score for a word $w_i$ and a particular type classification ty (e.g., a sum of frequency scores associated with each word in term T that indicates the particular type classification), and $\Sigma_{\forall T y \in S_i''} C(w_i, ty)$ may represent a sum of type frequency scores for word $w_i$ and all type classifications indicated by word $w_i$ (e.g., for each type ty included in the set $S_i''$, which represents a list of types identified for term T).

For a context-based analysis of a term T that is modified by n different modifiers (e.g., appears in n different contexts in the text), client device 210 may calculate a confidence score for a type relationship between the term and a particular type classification based on, for example, a quantity of modifiers that modify the term in the text, a quantity of modifiers that indicate the particular type classification, and/or a weight value. For example, client device 210 may calculate a confidence score for a context-based analysis as follows:

$$\text{Confidence}(T, ty_i) = \left[ \frac{n_i}{m} \right] * \gamma_c$$

In the above expression, Confidence(T, $ty_i$) may represent a confidence score for a type relationship between term T and type $ty_i$, $n_i$ may represent a quantity of modifiers that indicate a type relationship between term T and $ty_i$, $y_c$ may represent a weight value (e.g., a default weight value, such as a default weight value of 0.9; a weight value input by a user; a weight value that indicates a relative weight to be given to the context-based analysis as compared to the name-based analysis, such as 0.9; etc.), and m may represent a sum of each $n_i$ value corresponding to each type classification $ty_i$ associated with term T. In other words, m may be represented as follows:

$$m = \Sigma_{i \in [1,k]} n_i$$

As an example, assume that client device 210 applies a context-based analysis to the term "ID proof" that is modified by three different modifiers (e.g., appears in three different contexts), such as "scan" (e.g., "scanned ID proof" appears in the text), "valid" (e.g., "valid ID proof" appears in the text), and "number" (e.g., "numbered ID proof" appears in the text). Further, assume that "scan" indicates a multimedia type and "number" indicates a numeric type. Thus, client device 210 determines that $ty_1$='multimedia type,' $ty_2$='numeric type,' n=3, $n_1$=1, $n_2$=1, and m=2. Based on this information, and using a weight value of 0.9, client device 210 may calculate confidence scores for a type relationship between the term "ID proof" and each type classification as follows:

$$\text{Confidence(ID proof, multimedia)} = \left[\frac{1}{2}\right] * 0.9 = 0.45$$

$$\text{Confidence(ID proof, numeric)} = \left[\frac{1}{2}\right] * 0.9 = 0.45$$

For a value-based analysis of a term T for which h sentences (or text sections) indicate a relationship between the term and a value (e.g., $S_T = \{s_1, s_2, \ldots s_h\}$, where $S_T$ represents the set of sentences where term T appears and a value-based analysis determined a potential value candidate for term T), client device 210 may calculate a confidence score for a type relationship between the term and a particular type classification based on, for example, a proximity between the term and a value that indicates the particular type classification, a quantity of sentences that include the term and a value that indicates the particular type classification, a weight value, or the like. For example, client device 210 may calculate a confidence score for a value-based analysis as follows:

$$\text{Confidence}(T, ty) = \left[ \frac{\sum_{s \in S_{ty}} \Delta_s}{|S_T|} \right] * \gamma_v$$

In the above expression, Confidence(T, ty) may represent a confidence score for a type relationship between term T and type $t_y$, $\Sigma_{s \in S_{ty}} \Delta_s$ may represent a sum of sentence scores for each sentence in the text that indicates a type relationship between term T and type $t_y$ (e.g., for each sentence that includes term T and a value that indicates a type relationship between term T and type $t_y$), $S_T$ may represent a quantity of sentences that indicate a relationship between term T and any type classification (e.g., using a value-based analysis), and $\gamma_v$ may represent a weight value (e.g., a default weight value, such as a default weight value of 0.7; a weight value input by a user; a weight value that indicates a relative weight to be given to the context-based analysis as compared to the name-based analysis, such as 0.7; etc.).

In some implementations, client device 210 may determine the sentence score based on, for example, a quantity of terms between a value and the beginning of a sentence, a quantity of terms between a value and another value, a quantity of terms that are candidates for association with the value (e.g., a quantity of terms included in a sentence that includes the value), a quantity of terms between a particular term and the value, a quantity of values between the particular term and the value, a quantity of characters, words, etc. between the particular term and the value, or the like. As an example, client device 210 may calculate a sentence score as follows:

$$\Delta_s = \frac{1}{m_s}\left(1 - \frac{1}{d_T}\right)$$

In the above expression, $\Delta_s$ may represent a sentence score for sentence s, $m_s$ may represent a quantity of terms that are candidates for association with the value (e.g., a quantity of term between the value and the beginning of the sentence, a quantity of terms between the value and another value, etc.), and $d_T$ may represent a distance between term T and the value (e.g., a quantity of terms between term T and the value).

As further shown in FIG. 6, process 600 may include refining one or more type classifications (block 650). For example, client device 210 may refine type classifications by merging type classifications for explicit alias terms, by performing a type hierarchy analysis, or the like. In some implementations, client device 210 may merge type lists for explicit alias terms. For example, client device 210 may determine whether two (or more) terms are alias terms by analyzing the text for an alias indicator and terms associated with the alias indicator. An alias indicator may indicate that multiple terms are aliases of one another (e.g., the multiple terms represent the same concept). In some implementations, client device 210 may receive information identifying alias indicators (e.g., based on input received from a user and/or another device).

An alias indicator may include a pattern (e.g., a particular sequence and/or combination of characters, words, terms, etc. that appear in the text) that indicates that two or more terms are alias terms. Examples of alias indicators include, but are not limited to, also known as, aka, sometimes also known as, generally also known as, generally known as, better known as, will be referred to, will be referred as, will be referred henceforth as, will be known as, henceforth, is also referred as, also called, also called as, will be used instead of, will be mentioned as, written as, will be written as, alias, or the like.

Client device 210 may merge type classifications associated with alias terms. For example, for a first alias term associated with a first set of type classifications, and a second alias term associated with a second set of type classifications, client device 210 may generate a third set of type classifications equal to the union of the first set and the second set (e.g., where a type classification included in one of the first set or the second set is included in the third set, and where a type classification included in both the first set and the second set is only included once in the third set), and may associate the third set of type classifications with the first alias term and the second alias term. Additionally, or alternatively, client device 210 may merge constituents for alias terms associated with a composite type (e.g., by taking a union of a first set of constituent terms and a second set of constituent terms), and may associate the merged set with each alias term.

Additionally, or alternatively, client device 210 may refine one or more type classifications by performing a type hierarchy analysis. For example, if a particular term is associated with a sub-type (e.g., integer), and a super-type of the sub-type (e.g., numeric), then client device 210 may remove the super-type from the set of type classifications associated with the particular term, and may retain the sub-types in the set. Examples of type hierarchy relationships include the float type as a super-type of the integer type and the age type, the integer type as a super-type of the age type, the string type as a super-type of the URL type, the time type as a super-type of the date type, etc.

As further shown in FIG. 6, process 600 may include generating and applying test data to test type classifications (block 655). For example, client device 210 may generate test data for a term based on the type classification(s) determined for the term. Client device 210 may apply the test data to a system (e.g., a computer program) that is designed based on the text (e.g., a requirements document). Additionally, or alternatively, client device 210 may provide the test data (e.g., for display), and a user may use the test data to test the system.

Client device 210 may generate the test data based on a set of test data rules that indicate valid test data for one or more type classifications. Client device 210 may receive the set of test data rules based on input received from a user and/or another device. In some implementations, client device 210 may generate positive test data (e.g., test data that should not generate a system error when tested) and/or negative test data (e.g., test data that should generate a system error when tested). The following table shows example rules for generating positive and negative test data, and example positive and negative test data values, for different type classifications:

| Type Class. | Rules to Generate Positive Test Data, and Examples of Positive Test Data | Rules to Generate Negative Test Data, and Examples of Negative Test Data |
|---|---|---|
| Float | A positive or negative number with a decimal point<br>Examples: 11.11, 100.00, 0.00, 1.99 | Blank space as value (" ")<br>Special characters excluding '.', '-', and '/'<br>A string with only non-numeric characters<br>Examples: ., " ", abc, @abc, ab.cd |
| Integer | A positive or negative number without a decimal point.<br>Examples: 1, 100, 1743 | Blank space as value (" ")<br>Special characters excluding '-'<br>A string with only non-numeric characters<br>Examples: ., " ", abc, @abc, 10.51 |
| Age | A positive number<br>Examples: 1, 100, 1743 | Blank space as value (" ")<br>Negative numbers<br>A string with only non-numeric characters<br>Examples: ., " ", abc, @abc, −10.51 |
| Enumerator | | Blank space as value (" ")<br>Example: " " |
| URL | Any sting generated using the following syntax:<br>protocol://domain/path<br>Example: http://www.example.com | Blank space as value (" ")<br>'.' as a value<br>Multi-paragraph text (e.g., from some story document)<br>Examples: ., " ",<br>"The URI syntax has been designed with . . . protocol.<br>The goal of . . . txtferred." |
| Email Address | Any string generated using the following syntax: [a-z]+@domain_path<br>Example: jan@mail.com | Blank space as value (" ")<br>'.' as a value<br>Multi-paragraph text<br>Examples: ., " ",<br>"The URI syntax has been designed with . . . protocol.<br>The goal of . . . txtferred." |
| Time | Time values in a special format like hh:mm, hh:mm:ss, or a single integer which can be followed by a unit like hh, pm, etc., where hh, mm and ss are integers, hh can be in the range of 0-11 or 1-12 (12 hour format), or 0-23 (24 hour format); mm and ss can be in the range 0-59<br>Examples: 12:12, 12:12:12, 00:00:00, 3 pm | Blank space as value (" ")<br>'.' as a value<br>Multi-paragraph text<br>Arbitrary text not following the rule of positive text data<br>Examples: ., " ", abc:45, 2.gtx, 2+5 |
| Date | Values in a format like dd/mm/yyyy; mm/dd/yyyy; mm/dd/yy; dd/mm/yy; yy/mm/dd; yyyy/mm/dd; dd-mmm-yyyy; dd(st\|th\|rd\|nd), mmm, yyyy, etc., where dd and yyyy are 2 digit and 4 digit positive integers (respectively), and mm can be an integer or string. dd should be in the range 1-31 and mm in the range 1-12.<br>Examples: 12/12/2012, 11-12-12, 11th Jan 2012, 11/28/2012 | Blank space as value (" ")<br>'.' as a value<br>Multi-paragraph text<br>Arbitrary text not following the rule of positive data<br>Examples: −1000, −1, #12, '12,3', 15, date, d," ", 12+12+12, 100/99/99, 13/13/13, 0, i/Jul/2014 |
| File/ Multimedia | | Arbitrary text spread across multiple paragraphs<br>Example:<br>"−1000, −1, #12, '12,3', 15, date, d," ", 12+12+12, 100/99/99, 13/13/13, 0, i/Jul/2014; gaccharpl laskkl f[ ][ \\a, gn oamv<br>Kg<br>Ok[P PV=" |
| Null | No input<br>Examples: "" | Some non-null string<br>Examples: −1000, "abc " |

As further shown in FIG. 6, process 600 may include providing the terms, the type classifications, the confidence scores, and/or the test data (block 660). For example, client device 210 may provide (e.g., for display on a user interface) a term, one or more type classifications determined for the term, a confidence score for each type classification determined for the term, and/or test data associated with the term. Additionally, or alternatively, client device 210 may provide this information to another device (e.g., for further analysis, to test a system, etc.).

In some implementations, client device 210 may provide this information via a user interface that permits a user to explore the information, navigate the information (e.g., to view constituent terms associated with a composite term), search the information (e.g., for a particular term, for terms associated with a particular type classification, for a particular range of confidence scores, etc.), or the like. Example user interfaces are described in more detail herein in connection with FIGS. 7A-7D. In this way, client device 210 may reduce the cost and improve the analysis and management of natural language text.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7D are diagrams of an example implementation 700 relating to example process 600 shown in FIG. 6. FIGS. 7A-7D show an example of processing text to infer type classifications of terms in the text, and providing information associated with processing the text. For the purpose of FIGS. 7A-7D, assume that the operations described herein in connection with FIGS. 5A and 5B have been performed.

Figure 7A:
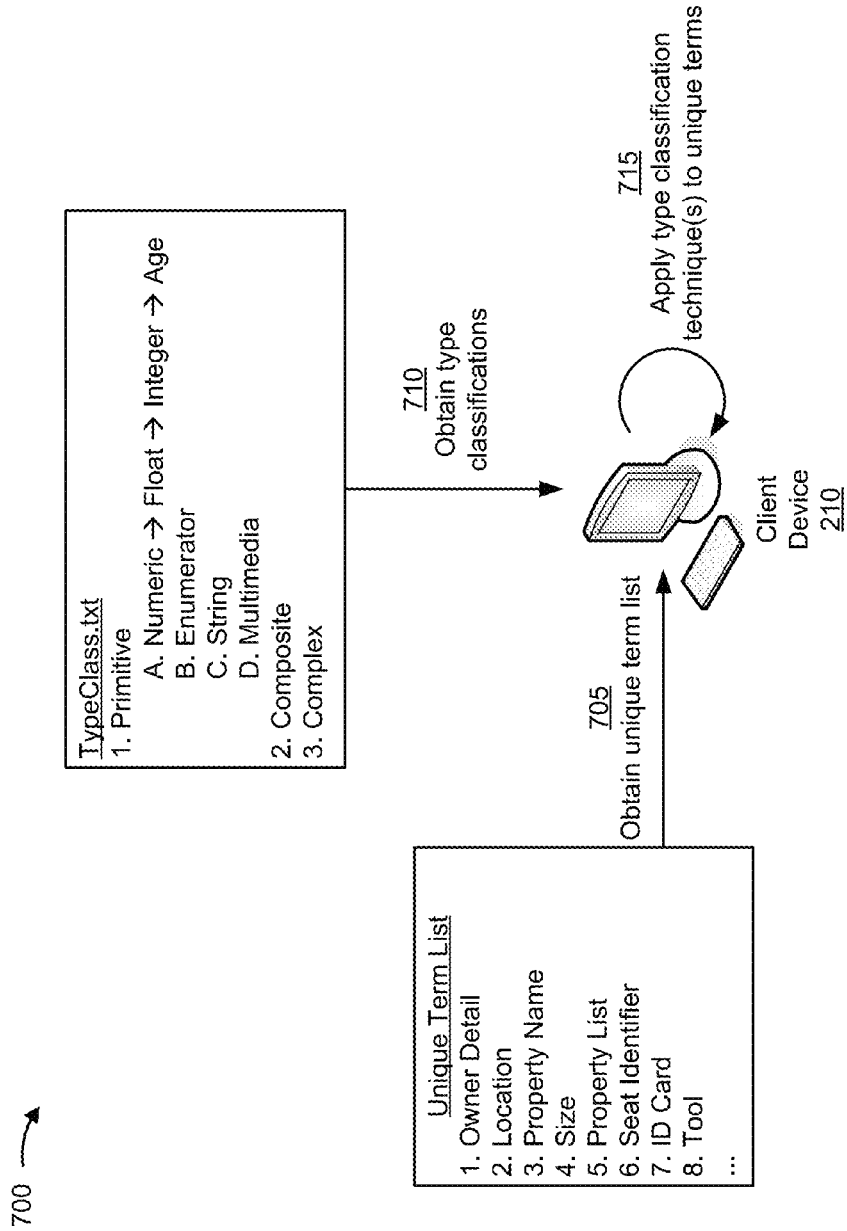

As shown in FIG. 7A, and by reference number 705, client device 210 obtains a unique term list. As shown, assume that the unique term list includes the terms owner detail, location, property name, size, property list, seat identifier, ID card, and tool. As shown by reference number 710, client device 210 also obtains information identifying type classifications to be used to classify the terms in the unique term list. As shown, assume that the type classifications include primate types, composite types, and complex types. Further, assume that the primitive types include a numeric type, which is a super-type of the sub-types float, integer, and age, and further include an enumerator type, a string type, and a multimedia type. As shown by reference number 715, client device 210 applies one or more type classification techniques to classify the unique terms based on the type classifications.

As shown in FIG. 7B, assume that client device 210 outputs a result of applying the type classification techniques to the unique terms. For example, assume that client device 210 provides a user interface that identifies a term, a type classification determined for the term, a confidence score for a type relationship between the term and the type classification, positive test data for the term, and negative test data for the term. For example, as shown by reference number 720, assume that the term "article length" is associated with an integer type classification, that this type classification was determined using a name-based analysis, that the type relationship between "article length" and the integer type classification is high (e.g., above a threshold value), that positive test data for "article length" includes the values 1 and 100, and that negative test data for "article length" includes the values abc, @abc, ab.cd, and 12.23.

As shown by reference number 725, the user interface may provide an input mechanism that permits the user to cause client device 210 to show or hide the positive test data and/or the negative test data. As shown by reference number 730, the user interface may provide input mechanisms that permits the user to cause client device 210 to clear the user interface (e.g., a "Reset" button) or to save the data associated with the type classification analysis (e.g., a "Save" button).

As shown by reference number 735, user interface may provide an input mechanism that permits the user to cause client device 210 to display information associated with a composite term (e.g., a "Next" button). For example, as shown by reference number 740, assume that the user selects to display information associated with the term "property list," which is a composite type with a high confidence score. After making this selection, assume that the user interacts with the "Next" button.

As shown in FIG. 7C, user interaction with the "Next" button causes client device 210 to provide a user interface that displays information associated with selected composite terms. For example, this user interface provides information that identifies three composite terms, shown as "property list," "custdetail," and "record." The user interface provides information that identifies constituent terms that are represented by the composite term. For example, the user interface indicates that the constituent terms "owner detail," "location," "property name," and "size" are constituents of the composite term "property list." As shown by reference number 745, the user interface may provide an input mechanism (e.g., a "Previous" button) that causes client device 210 to return to a previous user interface (e.g., shown in FIG. 7B), and/or may provide an input mechanism (e.g., a "Next" button) that causes client device 210 to provide a user interface for displaying type classifications associated with selected terms on the user interface shown in FIG. 7C.

As shown in FIG. 7D, assume that client device 210 outputs a result of applying the type classification techniques to composite terms and/or the constituent terms. For example, assume that client device 210 provides a user interface that identifies a composite term, one or more constituent terms associated with the composite term, a type classification determined for the constituent term, a confidence score for a type relationship between the constituent term and the type classification, positive test data for the constituent term, and negative test data for the constituent term. For example, as shown by reference number 750, assume that the composite term "property list" is associated with a constituent term "owner detail" with a type classification of "string," that this type classification was determined using a synonym-based analysis, that the type relationship between "owner detail" and the string type classification is high (e.g., above a threshold value), that example positive test data for "owner detail" includes the values "abc" and "Hello."

In this way, client device 210 permits a user to analyze, manage, and explore information included in a text document. Furthermore, client device 210 reduces the time and effort required to analyze text to classify terms, included in the text, according to type classifications, and to generate test data that can be used to test a system that was designed based on the text document.

As indicated above, FIGS. 7A-7D are provided merely as an example. Other examples are possible and may differ from what was described with regard to FIGS. 7A-7D.

Implementations described herein assist in inferring type classifications for terms included in text. Furthermore, implementations described herein permit indexing, searching, and exploration of terms and/or type classifications. Furthermore, implementations described herein assist in assigning example values to terms to generate test data for testing a system designed based on the text.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    an interface including one or more of a communication interface or a user interface;
    a memory; and
    one or more processors to:
        obtain, via the interface or from the memory, information identifying type classifications,
            each type classification, of the type classifications, indicating that terms classified under the type classification are expressed by a particular type of value of a plurality of types of values,
            the plurality of types of values including character strings and numeric values;
        obtain, via the interface, text to be processed to infer one or more type classifications, of the type classifications, associated with terms in the text,
            the text being included in a file associated with development of a computer program for a computer system, and
            each respective term, of the terms, being associated with a plurality of different possible values of a same type classification of the one or more type classifications;
        standardize the text to prepare the text for processing by adjusting at least one character in the text of the file;
        process the text that has been standardized to identify terms in the text based on delimiting characters in the text;
        associate at least one tag with the identified terms in the text, the at least one tag being one or more of a part-of-speech tag, an entity tag, or a term tag;
        extract, based on the at least one tag associated with the terms, one or more terms, of the terms identified in the text, as unique terms for which to infer the one or more type classifications,
            a quantity of the unique terms being fewer than a quantity of the terms identified in the text;
        generate a data structure that stores the unique terms;
        perform one or more type classification techniques to infer the one or more type classifications corresponding to the unique terms,
            the one or more type classification techniques including at least one of:
                a name-based analysis that compares the unique terms to one or more sets of name-based type indicators corresponding to the one or more type classifications,
                a context-based analysis that compares one or more modifiers, that modify the unique terms, to one or more sets of context-based type indicators corresponding to the one or more type classifications,
                a synonym-based analysis that compares one or more synonyms, of the unique terms, to the one or more sets of name-based type indicators corresponding to the one or more type classifications, or
                a value-based analysis that compares one or more values, associated with the unique terms, to one or more sets of value-based type indicators corresponding to the one or more type classifications;
        classify the unique terms by assigning the one or more type classifications to the unique terms based on performing the one or more type classification techniques;
        provide, for display via the interface, information associated with development of the computer program,
            the information associated with development of the computer program indicating a type relationship between a particular term, of the unique terms, and a particular type classification of the one or more type classifications;

receive, via the interface, a set of test data rules from a user or from another device;
generate test data based on the set of test data rules,
the test data including the unique terms to be classified, type classifications under which the unique terms are to be classified, and values for the unique terms;
apply the test data to the computer program,
the computer program being designed based on the text that was processed to infer one or more type classifications for the unique terms extracted from the text, and
the applying of the test data to the computer program includes input of the test data to the computer program and executing the computer program to:
classify the test data to obtain a confidence score associated with the classifying a unique term, of the unique terms, under each of the type classifications determined to be associated with the unique term; and
provide, for display to the user or to another device, the test data, the one or more type classifications generated from the test data, and the confidence score associated with the one or more type classifications.

2. The device of claim 1, where the one or more processors are further to:
generate a type classification equation that indicates a relationship between the particular term and another term of the unique terms; and
classify the other term by assigning the particular type classification to the other term based on generating the type classification equation,
the information associated with development of the computer program identifying a relationship between the other term and the particular type classification based on classifying the other term using the particular type classification.

3. The device of claim 1, where the one or more processors are further to: associate tags with terms in the text,
the tags indicating whether a term is to be classified using the one or more type classifications;
identify the unique terms to be classified based on associating the tags with the terms; and
where the one or more processors, when classifying the unique terms, are to:
classify the unique terms based on identifying the unique terms to be classified.

4. The device of claim 1, where the one or more type classifications include:
a plurality of primitive type classifications used to classify terms that do not represent other terms in the text; and
a composite type classification used to classify terms that represent at least one other term in the text.

5. The device of claim 1, where the one or more processors, when performing the one or more type classification techniques, are to:
perform two or more type classification techniques to infer the one or more type classifications corresponding to the unique terms,
the two or more type classification techniques including at least two of:
the name-based analysis,
the context-based analysis,
the synonym-based analysis, or
the value-based analysis.

6. The device of claim 1, where the one or more type classifications include at least one of:

a numeric values type classification that indicates values associated with the respective term are represented by numeric values,
a floating point values type classification that indicates values associated with the respective term are represented by floating point values,
an integer values type classification that indicates values associated with the respective term are represented by integer values,
a string values type classification that indicates values associated with the respective term are represented by string values, or
a Boolean values type classification that indicates values associated with the respective term are represented by Boolean values.

7. A non-transitory computer-readable medium storing instructions, the instructions comprising:
one or more instructions that, when executed by one or more processors, cause the one or more processors to:
obtain, via an interface or from a memory, information identifying type classifications,
the interface including one or more of a communication interface or a user interface,
each type classification, of the type classifications, indicating that terms classified under the type classification are expressed by a particular type of value of a plurality of types of values, and
the plurality of types of values including character strings and numeric values;
obtain, via the interface, text to be processed to infer one or more type classifications, of the type classifications, associated with terms in the text,
the text being included in a file associated with development of a computer program, and
each respective term, of the terms, being associated with a plurality of different possible values of a same type classification of the one or more type classifications;
standardize the text to prepare the text for processing by adjusting at least one character in the text of the file;
process the text that has been standardized to identify terms in the text based on delimiting characters in the text;
associate at least one tag with the identified terms in the text, the at least one tag being one or more of a part-of-speech tag, an entity tag, or a term tag;
extract, based on the at least one tag associated with the terms, one or more terms, of the terms identified in the text, U for which to infer the one or more type classifications,
a quantity of the unique terms being fewer than a quantity of the terms identified in the text;
generate a data structure that stores the unique terms;
infer the one or more type classifications corresponding to the unique terms by performing one or more type classification techniques,
the one or more type classification techniques including at least one of:
a name-based analysis that compares the unique terms to name-based type indicators that indicate the one or more type classifications,
a context-based analysis that compares one or more modifiers, that modify the unique terms, to context-based type indicators that indicate the one or more type classifications, a synonym-based analysis that compares one or more synonyms, of the unique terms, to the name-based type indicators that indicate the one or more type classifications, or a value-based analysis that compares one or more values, associated with the unique terms, to value-based type indicators that indicate the one or more type classifications;

classify the unique terms by assigning the one or more type classifications to the unique terms based on performing the one or more type classification techniques;

provide, for display via the interface, information associated with development of the computer program, the information associated with development of the computer program indicating a type relationship between a particular type classification, of the one or more type classifications, and a particular term, of the unique terms;

receive, via the interface, a set of test data rules from a user or from another device;

generate test data based on the set of test data rules, the test data including the unique terms to be classified, type classifications under which the unique terms are to be classified, and values for the unique terms;

apply the test data to the computer program, the computer program being designed based on the text that was processed to infer one or more type classifications for the unique terms extracted from the text, and the applying of the test data to the computer program includes input of the test data to the computer program and executing the computer program to:
classify the test data to obtain a confidence score associated with the classifying a unique term, of the unique terms, under each of the type classifications determined to be associated with the unique term; and provide, for display to the user or to another device, the test data, the one or more type classifications generated from the test data, and the confidence score associated with the one or more type classifications.

8. The non-transitory computer-readable medium of claim 7, where the one or more instructions, that cause the one or more processors to generate the test data, cause the one or more processors to:

generate, based on the particular type classification, positive test data for testing particular types of values that the particular term is intended to represent; and
generate, based on the particular type classification, negative test data for testing particular types of values that the particular term is not intended to represent,
the information associated with development of the computer program identifying the positive test data and the negative test data.

9. The non-transitory computer-readable medium of claim 7, where the one or more instructions, that cause the one or more processors to infer the one or more type classifications, cause the one or more processors to:

infer that the particular term corresponds to a composite type classification,
the composite type classification indicating that the particular term represents one or more constituent terms included in the text, the information associated with development of the computer program indicating a relationship between the particular term and the one or more constituent terms.

10. The non-transitory computer-readable medium of claim 7, where the name-based type indicators, the context-based type indicators, and the value-based type indicators include different sets of type indicators.

11. The non-transitory computer-readable medium of claim 7, where the one or more instructions, when executed by the one or more processors, further cause the one or more processors to:

generate a plurality of type classification equations that indicate relationships between terms included in the text,
at least one type classification equation, of the plurality of type classification equations, indicating a relationship associated with the particular term;
analyze the plurality of type classification equations; and
determine another type relationship between the particular type classification or another type classification, of the one or more type classifications, and another term, of the unique terms, based on analyzing the plurality of type classification equations,
the information associated with development of the computer program indicating the other type relationship.

12. The non-transitory computer-readable medium of claim 7, where the one or more type classifications include at least one of:

a numeric values type classification that indicates values associated with the respective term are represented by numeric values, or
a floating point values type classification that indicates values associated with the respective term are represented by floating point values.

13. The non-transitory computer-readable medium of claim 7, where the one or more type classifications include at least one of:

an integer values type classification that indicates values associated with the respective term are represented by integer values,
a string values type classification that indicates values associated with the respective term are represented by string values, or
a Boolean values type classification that indicates values associated with the respective term are represented by Boolean values.

14. A method, comprising:

obtaining, by a device, information identifying type classifications via an interface or from a memory,
the interface including one or more of a communication interface or a user interface,
each type classification, of the type classifications, indicating that terms classified under the type classification are expressed by a particular type of value of a plurality of types of values,
the plurality of types of values including character strings and numeric values;

obtaining, by the device and via the interface, text to be processed to infer one or more type classifications associated with unique terms,
the text being included in a file associated with development of a computer program for a computer system, and each respective term, of the terms, being associated with a plurality of different possible values of a same type classification of the one or more type classifications;

standardizing, by the device, the text to prepare the text for processing by adjusting at least one character in the text of the file;

processing, by the device, the text that has been standardized to identify terms in the text based on delimiting characters in the text;

associating, by the device, at least one tag with the identified terms in the text, the at least one tag being one or more of a part-of-speech tag, an entity tag, or a term tag;

extracting, by the device and based on the at least one tag associated with the terms, one or more terms, of the terms identified in the text, as unique terms for which to infer the one or more type classifications, a quantity of the unique terms being fewer than a quantity of the terms identified in the text;

generating a data structure that stores the unique terms;

inferring, by the device, a type relationship between a particular term, of the unique terms stored in the data structure, and a particular type classification, of the one or more type classifications, by performing one or more type classification techniques, the one or more type classification techniques including at least one of:
 a name-based analysis that compares the particular term to a set of name-based type indicators associated with the particular type classification,
 a context-based analysis that compares a modifier, that modifies the particular term, to a set of context-based type indicators associated with the particular type classification,
 a synonym-based analysis that compares a synonym, of the particular term, to the set of name-based type indicators associated with the particular type classification, or
 a value-based analysis that compares a value, that appears within a threshold proximity of the particular term, to a set of value-based type indicators or a set of value-based type patterns associated with the particular type classification;

classifying, by the device, the unique terms by assigning the one or more type classifications to the unique terms based on performing the one or more type classification techniques;

providing, for display via the interface and by the device, information associated with development of the computer program, the information associated with development of the computer program identifying the type relationship, between the particular term and the particular type classification, based on inferring the type relationship and further based on performing the one or more type classification techniques;

receiving, via the interface and by the device, a set of test data rules from a user or from another device;

generating, by the device, test data based on the set of test data rules, the test data including the unique terms to be classified, type classifications under which the unique terms are to be classified, and values for the unique terms;

applying, by the device, the test data to the computer program, the computer program being designed based on the text that was processed to infer one or more type classifications for the unique terms extracted from the text, and the applying of the test data to the computer program includes input of the test data to the computer program and executing the computer program to:
 classify the test data to obtain a confidence score associated with the classifying a unique term, of the unique terms, under each of the type classifications determined to be associated with the unique term; and providing, by the device and for display to the user or to another device, the test data, the one or more type classifications generated from the test data, and the confidence score associated with the one or more type classifications.

15. The method of claim 14, where inferring the type relationship by performing the one or more type classification techniques comprises:
 performing the name-based analysis;
 determining, based on performing the name-based analysis, that the particular term includes a first word that matches a second word included in the set of name-based type indicators; and
 inferring the type relationship based on determining that the particular term includes the first word that matches the second word.

16. The method of claim 14, where inferring the type relationship by performing the one or more type classification techniques comprises:
 performing the context-based analysis;
 determining, based on performing the context-based analysis, that the modifier includes a first word that matches a second word included in the set of context-based type indicators; and
 inferring the type relationship based on determining that the modifier includes the first word that matches the second word.

17. The method of claim 14, where inferring the type relationship by performing the one or more type classification techniques comprises:
 performing the synonym-based analysis;
 determining, based on performing the synonym-based analysis, that the synonym includes a first word that matches a second word included in the set of name-based type indicators; and
 inferring the type relationship based on determining that the synonym includes the first word that matches the second word.

18. The method of claim 14, where inferring the type relationship by performing the one or more type classification techniques comprises:
 performing the value-based analysis;
 determining, based on performing the value-based analysis, that the value matches another value included in the set of value-based type indicators or that the value matches a value-based type pattern included in the set of value-based type patterns; and
 inferring the type relationship based on determining that the value matches the other value or that the value matches the value-based type pattern.

19. The method of claim 14, where the one or more type classifications include at least one of:
 a numeric values type classification that indicates values associated with the respective term are represented by numeric values, or a floating point values type classification that indicates values associated with the respective term are represented by floating point values.

20. The method of claim 14, where the one or more type classifications include at least one of:
  an integer values type classification that indicates values associated with the respective term are represented by integer values,
  a string values type classification that indicates values associated with the respective term are represented by string values, or
  a Boolean values type classification that indicates values associated with the respective term are represented by Boolean values.

* * * * *

UNITED STATES PATENT AND TRADEMARK OFFICE
CERTIFICATE OF CORRECTION

PATENT NO. : 9,880,997 B2
APPLICATION NO. : 14/478906
DATED : January 30, 2018
INVENTOR(S) : Janardan Misra et al.

It is certified that error appears in the above-identified patent and that said Letters Patent is hereby corrected as shown below:

In the Claims

In Claim 7, Column 36, Line 51, "the text, U for which to infer the one or more type," should be changed to -- the text, as unique terms for which to infer the one or more type, --.

Signed and Sealed this
Ninth Day of June, 2020

Andrei Iancu
*Director of the United States Patent and Trademark Office*